United States Patent
Geng et al.

(10) Patent No.: US 10,678,705 B2
(45) Date of Patent: Jun. 9, 2020

(54) EXTERNAL PAGING AND SWAPPING FOR DYNAMIC MODULES

(71) Applicant: QUALCOMM Incorporated, San Diego, CA (US)

(72) Inventors: Nieyan Geng, San Diego, CA (US); Gurvinder Singh Chhabra, San Diego, CA (US); Caoye Shen, San Diego, CA (US); Samir Thakkar, San Diego, CA (US); Chuguang He, San Marcos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/130,069

(22) Filed: Sep. 13, 2018

(65) Prior Publication Data

US 2020/0089616 A1    Mar. 19, 2020

(51) Int. Cl.
*G06F 12/10* (2016.01)
*G06F 12/109* (2016.01)
(Continued)

(52) U.S. Cl.
CPC .......... *G06F 12/109* (2013.01); *G06F 9/4401* (2013.01); *G06F 9/45558* (2013.01); *G06F 9/5016* (2013.01); *G06F 9/5077* (2013.01); *G06F 12/0246* (2013.01); *G06F 2009/45583* (2013.01); *G06F 2209/5011* (2013.01); *G06F 2209/5014* (2013.01); *G06F 2212/151* (2013.01); *G06F 2212/401* (2013.01); *G06F 2212/657* (2013.01); *G06F 2212/7201* (2013.01)

(58) Field of Classification Search
CPC .... G06F 12/109; G06F 9/4401; G06F 9/5016; G06F 9/5077
See application file for complete search history.

(56) References Cited

U.S. PATENT DOCUMENTS 7,236,987 B1   6/2007  Faulkner et al.
9,274,839 B2   3/2016  Schluessler et al.
(Continued)

OTHER PUBLICATIONS

Anonymous: "Firmware—Wikipedia", Sep. 4, 2018 (Sep. 4, 2018), XP055647238, Retrieved from the Internet: URL: https://en.wikipedia.org/w/index.php?title=Firmware&oldid=857994188 [retrieved on Nov. 28, 2019 ], Paragraph 1—Paragraph 3.
(Continued)

*Primary Examiner* — Than Nguyen
(74) *Attorney, Agent, or Firm* — The Marbury Law Group, PLLC

(57) ABSTRACT

Various embodiments include methods and devices for implementing external paging and swapping for dynamic modules on a computing device. Embodiments may include assigning static virtual addresses to a base image and dynamic modules of a static image of firmware of the computing device from a virtual address space for the static image, decompose static image into the base image and the dynamic modules, load the base image to an execution memory during a boot time from first partition of a storage memory, reserve a swap pool in the execution memory during the boot time, and load a dynamic module of the dynamic modules to the swap pool from a second partition of storage memory during a run time.

26 Claims, 13 Drawing Sheets

(51) Int. Cl.
*G06F 9/50* (2006.01)
*G06F 9/4401* (2018.01)
*G06F 12/02* (2006.01)
*G06F 9/455* (2018.01)

(56) References Cited

U.S. PATENT DOCUMENTS

| | | |
|---|---|---|
| 9,779,472 B2 | 10/2017 | Rao et al. |
| 2005/0246518 A1 | 11/2005 | Takahashi |
| 2006/0190939 A1* | 8/2006 | Chen .................. G06F 8/65 |
| | | 717/168 |
| 2016/0320994 A1* | 11/2016 | Chun .................. G06F 3/0625 |
| 2017/0076072 A1* | 3/2017 | Koren .................. G06F 21/105 |
| 2018/0046823 A1 | 2/2018 | Durham et al. |
| 2018/0082397 A1 | 3/2018 | Bobrovsky et al. |
| 2019/0278636 A1* | 9/2019 | Dabak ............... G06F 9/44594 |

OTHER PUBLICATIONS

Anonymous: "Zlib—Wikipedia", Mar. 5, 2018 (Mar. 5, 2018), XP055647235, Retrieved from the Internet: URL:.https://en.wikipedia.org/w/index.php?title=Zlib&oldid=828866790 [retrieved on Nov. 28, 2019], p. 3, Section "Applications".
International Search Report and Written Opinion — PCT/US2019/050138 — ISA/EPO — Dec. 16, 2019 (181681WO).

* cited by examiner

EXTERNAL PAGING AND SWAPPING FOR DYNAMIC MODULES

BACKGROUND

Some computing devices have limited memory resources, particularly purpose-built computing devices like Internet of Things (IoT) devices. Yet such computing devices may need to operate over a wide spectrum of use cases that can involve executing different code and using different data, both of which must be stored in memory. A simple implementation of a computing device is to load a single image encompassing the code and data for all of the use cases, and executing operations using the single image. This single image implementation facilitates testing, building, and change-tracking for a computing device.

SUMMARY

Various aspects include apparatuses and methods for external paging and swapping of dynamic modules on a computing device. Various aspects may include dynamic modules assigning static virtual addresses to a base image and dynamic modules of a static image of firmware of the computing device from a virtual address space for the static image, decomposing the static image into the base image and the dynamic modules, loading the base image to an execution memory during a boot time from a first partition of a storage memory, reserving a swap pool in the execution memory during the boot time, and loading a first dynamic module of the dynamic modules to the swap pool from a second partition of the storage memory during a run time.

In some aspects, the first dynamic module may include a code module and a data module, and loading the first dynamic module to the swap pool from a second partition of the storage memory may include loading the code module to the swap pool from the second partition of the storage memory. Some aspects may further include mapping a static virtual address of the code module to a physical block address of the second partition of the storage memory, mapping a static virtual address of the data module to a physical block address of a third partition of the storage memory, and mapping the static virtual address of the code module to a physical address of the swap pool of the execution memory.

In some aspects, reserving a swap pool in an execution memory during the boot time may include reserving a portion of the execution memory sized to store a largest of the dynamic modules.

In some aspects, the dynamic modules may include a plurality of code modules. In some aspects, reserving a swap pool in an execution memory during the boot time may include reserving a portion of the execution memory sized to store a compressed version of a largest of the plurality of code modules.

Some aspects may further include receiving a request to access a second dynamic module of the dynamic modules from the second partition of the storage memory, determining whether the first dynamic module is higher priority than the second dynamic module, and evicting the first dynamic module from the swap pool in response to determining that the first dynamic module is not higher priority than the second dynamic module.

In some aspects, the first dynamic module may include a code module and a data module. Some aspects may further include determining whether data generated by the first dynamic module during execution of the first dynamic module is needed for a subsequent execution of the first dynamic module, and storing the data to the data module in a third partition of the storage memory in response to determining that the data generated by the first dynamic module during execution of the first dynamic module is needed for a subsequent execution of the first dynamic module.

Some aspects may further include determining users of the first dynamic module, incrementing a reference count for each user determined to be using the first dynamic module, and decrementing the reference count for each user determined to no longer be using of the first dynamic module.

In some aspects, the first dynamic module may be in a compressed format. Some aspects may further include identifying that the first dynamic module is in the compressed format by an association of a static virtual address of the first dynamic module and an indicator that the first dynamic module is in the compressed format, in which loading a first dynamic module to the swap pool from a second partition of the storage memory during a run time may include decompressing the first dynamic module to load the first dynamic module to the swap pool.

Various aspects include computing devices having an execution memory, a storage memory, and a processor configured to perform operations of any of the methods summarized above. Various aspects include computing devices having means for performing functions of any of the methods summarized above. Various aspects include a processor readable storage medium on which are stored processor-executable instructions configured to cause a processor to perform operations of any of the methods summarized above.

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

DETAILED DESCRIPTION

Figure 1:
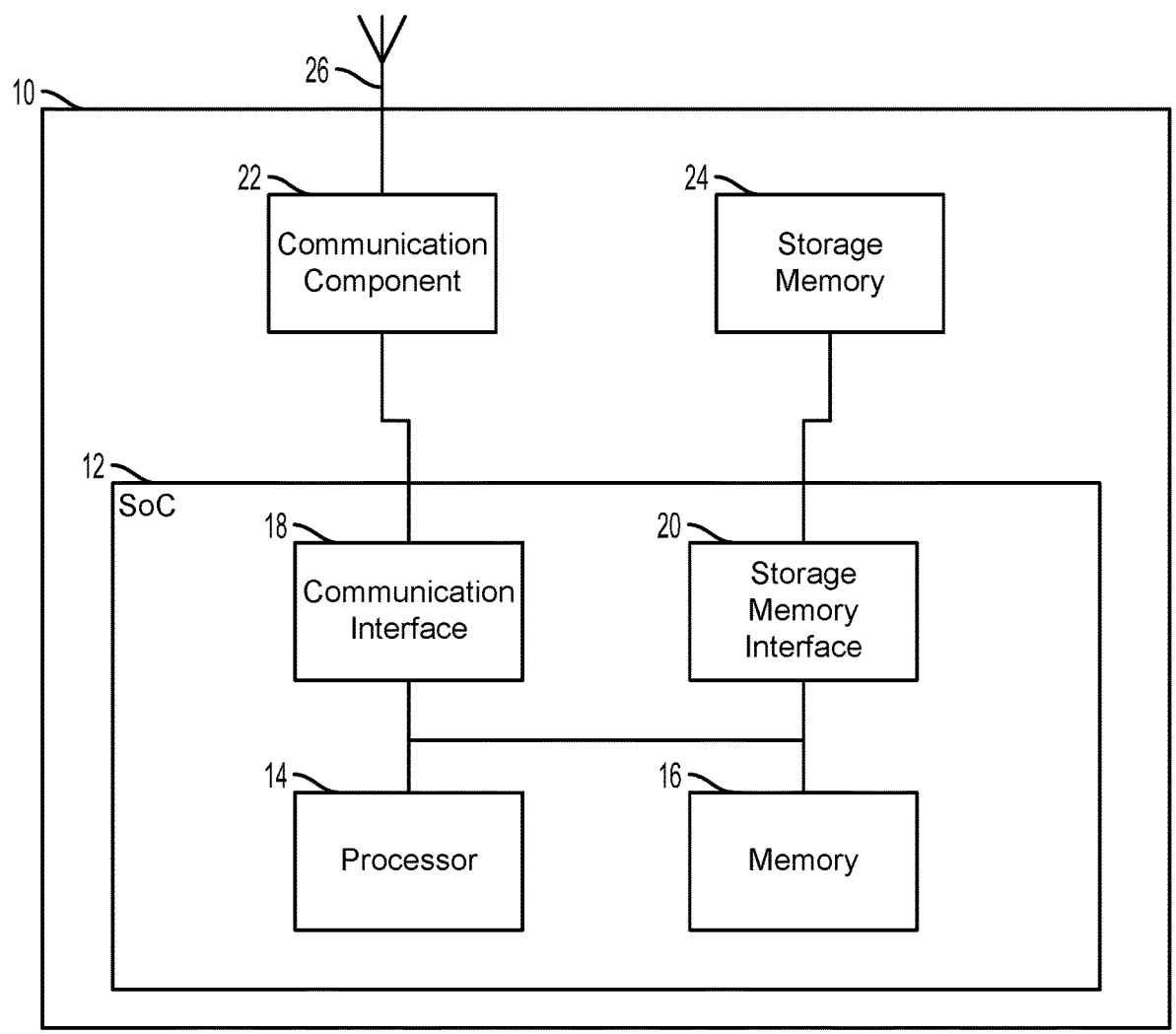
FIG. 1 is a component block diagram illustrating an example computing device suitable for implementing various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods, and computing devices implementing such methods, for memory management using external paging and swapping of statically linked and dynamically loaded code modules. Some embodiments may include decomposing a static image of firmware of a computing device into a baseline image and code modules for different hardware use cases. In some embodiments the code modules may be statically assigned virtual addresses within a virtual address space for the static image. The code modules may be dynamically swapped in and out of a swap pool of executable memory (e.g., random access memory (RAM)). The static virtual addresses of a code module loaded to the swap pool may be mapped to physical addresses of the swap pool. In various embodiments, management of the code modules loaded to the swap pool may be based on a need of the code modules for execution. In various alternative or additional embodiments, management of the code modules loaded to the swap pool may be based on priority of the code modules. The code modules may be compressed for storage (i.e., stored in a compressed format), and the code modules data may be decompressed before or as part of being stored to the executable memory for execution. In various embodiments, related data of the code modules may be compressed for storage (i.e., stored in a compressed format), and the related data may be decompressed before or as part of being stored to the executable memory for execution.

Various embodiments of memory management using external paging and swapping of statically linked and dynamically loaded code modules described herein provide technical advantages over existing memory technologies. Memory management using external paging and swapping of statically linked and dynamically loaded code modules according to various embodiments reduces memory resource demands for executing the various code modules. The reduction in memory resource demands allows for more efficient use of memory resources and use of smaller memory devices in computing devices with limited physical space and/or processing capacity, thereby lowering costs of computing devices.

The terms "computing device" is used herein to refer to any one or all of Internet of Things (IoT) devices, smart appliances, cellular telephones, smartphones, personal or mobile multi-media players, laptop computers, tablet computers, convertible laptops/tablets (2-in-1 computers), smartbooks, ultrabooks, netbooks, palm-top computers, wireless electronic mail receivers, multimedia Internet enabled cellular telephones, mobile gaming consoles, wireless gaming controllers, and similar personal electronic devices that include a memory and a programmable processor. The term "computing device" may further refer to stationary computing devices including personal computers, desktop computers, all-in-one computers, workstations, super computers, mainframe computers, embedded computers, servers, home theater computers, and game consoles.

The term "firmware" is used herein to refer to software instructions stored in non-volatile memory that provide low-level control of a computing device, including providing the operating environment or operation system for the computing device.

Computing devices implementing various embodiments may store various firmware for functions of hardware that are not all used at once. A computing device may generate a single static image of all of the firmware for the computing device and space for any data used for executing the firmware. In some embodiments, static virtual addresses may be assigned to various firmware modules or elements, including to functions within firmware, and to the space for data within a virtual address space for the static image. The static image may be decomposed into a baseline image, including essential firmware for operating the computing device, code modules, including firmware for different hardware use cases, and data modules for the space for data used for executing associated code modules. Designations for the sections of the static image to decompose into the baseline image, the code modules, and the data modules may be predetermined and provided to the computing device. Generating the single static image, assigning static virtual addresses, and decomposing the static image may be executed by a complier and/or linker during a compile time and/or a link time for a computing device.

In various embodiments, the baseline image, the code modules, and the data modules may be stored to a non-volatile storage memory, like a NAND flash memory. The code modules may be stored as pages of each of the code modules for various functions so that pages of the code modules may be loaded for execution of particular functions without having to load the entire code module. The code modules may be stored to a paging partition in the storage memory, and the data modules may be stored to a swap partition in the storage memory. The data modules may initially contain no data prior to execution of the associated code modules.

At boot time, a computing device may load the baseline image to the execution memory from the storage memory. A computing device implementing various embodiments may also reserve a section of the execution memory as a swap pool for dynamically loading the code modules from the storage memory to the execution memory. The swap pool may be sized for the largest code module, so the swap pool is large enough to store any of the code modules without using excess execution memory resources. The size of the swap pool may account for the data module needed to execute the largest code module.

In various embodiments, a code module may be dynamically loaded to the swap pool for execution of the code module during run time. Determinations of which code module to load and when to load the code module may be predictive (e.g., preload). Determinations of which code module to load and when to load the code module may be responsive (e.g., on demand). Preloading of a code module may be based on use case analysis correlating states of the computing device with likely functions of the computing device implemented by executing a code module. A look up table correlating the states of the computing device with the code modules may be used for the analysis. Demand loading of a code module may respond to a request for execution of functions that are implemented by executing a code module. A data module associated with a code module may also be loaded to the swap pool. When a code module is loaded to the swap pool, a memory manager may map the static virtual addresses of the code module to the physical addresses of the swap pool where the code module may be loaded.

In various embodiments, specific pages of a code module may be dynamically loaded to the swap pool for execution of the code module during run time. Determinations of which pages of the code module to load and when to load the pages may be predictive (e.g., preloaded). Determinations of which pages of the code module to load and when to load the pages may be responsive (e.g., on demand). Preloading of specific pages of the code module may be based on use case analysis correlating states of the computing device with likely functions of the computing device implemented by executing specific pages of the code module. A look up table correlating the states of the computing device with the specific pages of the code modules may be used for the analysis. Demand loading of specific pages of the code module may respond to a request for execution of functions that are implemented by executing a code module. A data module associated with pages of the code module may also be loaded to the swap pool. When specific pages of the code module are loaded to the swap pool, a memory manager may map the static virtual addresses of the specific pages of the code module to the physical addresses of the swap pool where the specific pages of the code module may be loaded.

For simplicity of explanation and clarity, various embodiments are described herein in terms of code modules, but are not exclusive of pages of code modules, and do not limit the scope of the descriptions or the claims.

Management of the swap pool may be implemented using various memory management polices (e.g., FIFO, LIFO, etc.), which may account for priorities of the code modules. The memory management policies may account for reference counts for indicating use of a code module in the swap pool. A code module may be evicted from the swap pool according to a memory management policy. Execution of the evicted code module may be interrupted and may later resume execution. Execution of the evicted code module may be interrupted and may later restart execution. The evicted code module may be expected to execute multiple times. Later execution of the evicted code module would need data relating to prior execution of the evicted code module. The data relating to the evicted code module may be stored to the associated data module in the storage device. Each code module may be assigned an associated state. The assigned associated state may be open. The assigned associated state may be closed. The assigned associated state may be suspended. The open state may indicate that the code module is loaded to the swap pool. The open state may further indicate that the code module's associated data module is loaded to the swap pool. The closed state may indicate a code module is not loaded to the swap pool. The closed state may further indicate a code module's associated data module is not loaded to the swap pool. The suspended state may indicate that a code module and an associated data module are not loaded to the swap pool and that the data module is stored to the swap partition in the storage memory. When a module is suspended, data in use and state data may be stored in a NAND swap partition for use in restarting the module when the associate function is called.

A compression engine may compress the baseline image and the largest code module. The swap pool may be sized approximately to the size of the compressed largest code module, where the size of the compressed largest code module may be larger than any of the remaining code modules so that the swap pool is large enough to store any of the code modules without using excess execution memory resources. The size of the swap pool may hold the data module needed to execute the largest compressed code module. The compression engine may determine when to decompress the compressed baseline image and the largest compressed code module based on the static virtual addresses being requested for execution from the execution memory.

The compression engine may compress the baseline image, the code modules, and the data modules. Rather than storing the compressed data modules in the swap partition of the storage memory, the compressed data modules may be stored with the compressed baseline image. The compressed data modules may be near zero (0) kB. The compression engine can determine when to decompress the compressed baseline image, the compressed code modules, and the compressed data modules based on the static virtual addresses being requested for execution from the execution memory.

In some embodiments, compression and decompression of memory lines, including the baseline image, code modules, and the data modules, and storage of, access to, retrieval of, and management of the compressed memory lines may be implemented by various methods, including those disclosed in U.S. Pat. No. 9,823,850 entitled "Priority-Based Access Of Compressed Memory Lines In Memory In A Processor-Based System" issued on Nov. 21, 2017, U.S. patent application Ser. No. 15/385,991 entitled "Reducing Or Avoiding Buffering Of Evicted Cache Data From An Uncompressed Cache Memory In A Compressed Memory System To Avoid Stalling Write Operations" filed on Dec. 21, 2016, U.S. Pat. No. 10,061,698 entitled "Reducing Or Avoiding Buffering Of Evicted Cache Data From An Uncompressed Cache Memory In A Compression Memory System When Stalled Write Operations Occur" issued on Aug. 28, 2018, and U.S. patent application Ser. No. 15/426,473 entitled "Reducing Bandwidth Consumption When Performing Free Memory List Cache Maintenance In Compressed Memory Schemes Of Processor-Based Systems" filed on Feb. 7, 2017, of which the entirety of the disclosures of each are herein incorporated by reference.

FIG. 1 illustrates a system including a computing device 10 suitable for use with various embodiments. The computing device 10 may include a system-on-chip (SoC) 12 with a processor 14, a memory 16, a communication interface 18, and a storage memory interface 20. The computing device 10 may further include a communication component 22, such as a wired or wireless modem, a storage memory 24, and an antenna 26 for establishing a wireless communication link. The processor 14 may include any of a variety of processing devices, for example a number of processor cores.

The term "system-on-chip" (SoC) is used herein to refer to a set of interconnected electronic circuits typically, but not exclusively, including a processing device, a memory, and a communication interface. A processing device may include a variety of different types of processors 14 and processor cores, such as a general purpose processor, a central processing unit (CPU), a digital signal processor (DSP), a graphics processing unit (GPU), an accelerated processing unit (APU), a secure processing unit (SPU), a subsystem processor of specific components of the computing device, such as an image processor for a camera subsystem or a display processor for a display, an auxiliary processor, a single-core processor, and a multicore processor. A processing device may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

An SoC 12 may include one or more processors 14. The computing device 10 may include more than one SoC 12, thereby increasing the number of processors 14 and processor cores. The computing device 10 may also include processors 14 that are not associated with an SoC 12. Individual processors 14 may be multicore processors as described below with reference to FIG. 2. The processors 14 may each be configured for specific purposes that may be the same as or different from other processors 14 of the computing device 10. One or more of the processors 14 and processor cores of the same or different configurations may be grouped together. A group of processors 14 or processor cores may be referred to as a multi-processor cluster.

The memory 16 of the SoC 12 may be a volatile configured for storing data and processor-executable code for access by the processor 14. The memory 16 of the SoC 12 may be a non-volatile memory configured for storing data and processor-executable code for access by the processor 14. The computing device 10 and/or SoC 12 may include one or more memories 16 configured for various purposes. One or more memories 16 may include volatile memories. The one or more memories 16 may include random access memory (RAM) or main memory. The one or more memories 16 may include cache memory. These memories 16 may be configured to temporarily hold a limited amount of data received from a data sensor or subsystem, data and/or processor-executable code instructions that are requested from non-volatile memory, loaded to the memories 16 from non-volatile memory in anticipation of future access based on a variety of factors, and/or intermediary processing data and/or processor-executable code instructions produced by the processor 14 and temporarily stored for future quick access without being stored in non-volatile memory.

The memory 16 may be configured to store data and processor-executable code, at least temporarily, that is loaded to the memory 16 from another memory device for access by one or more of the processors 14. The other memory device may include another memory 16. The other memory device may include a storage memory 24. The data or processor-executable code loaded to the memory 16 may be loaded in response to execution of a function by the processor 14. Loading the data or processor-executable code to the memory 16 in response to execution of a function may result from a memory access request to the memory 16 that is unsuccessful, or a "miss," because the requested data or processor-executable code is not located in the memory 16. In response to a miss, a memory access request to another memory 16 or storage memory 24 may be made to load the requested data or processor-executable code from the other memory 16 or storage memory 24 to the memory 16. Loading the data or processor-executable code to the memory 16 in response to execution of a function may result from a memory access request to another memory 16 or storage memory 24, and the data or processor-executable code may be loaded to the memory 16 for later access.

The storage memory interface 20 and the storage memory 24 may work in unison to allow the computing device 10 to store data and processor-executable code on a non-volatile storage medium. The storage memory 24 may be configured much like an embodiment of the memory 16 in which the storage memory 24 may store the data or processor-executable code for access by one or more of the processors 14. The storage memory 24, being non-volatile, may retain the information after the power of the computing device 10 has been shut off. When the power is turned back on and the computing device 10 reboots, the information stored on the storage memory 24 may be available to the computing device 10. The storage memory interface 20 may control access to the storage memory 24 and allow the processor 14 to read data from and write data to the storage memory 24.

Some or all of the components of the computing device 10 and/or the SoC 12 may be arranged differently and/or combined while still serving the functions of the various embodiments. The computing device 10 may not be limited to one of each of the components, and multiple instances of each component may be included in various configurations of the computing device 10.

Figure 2:
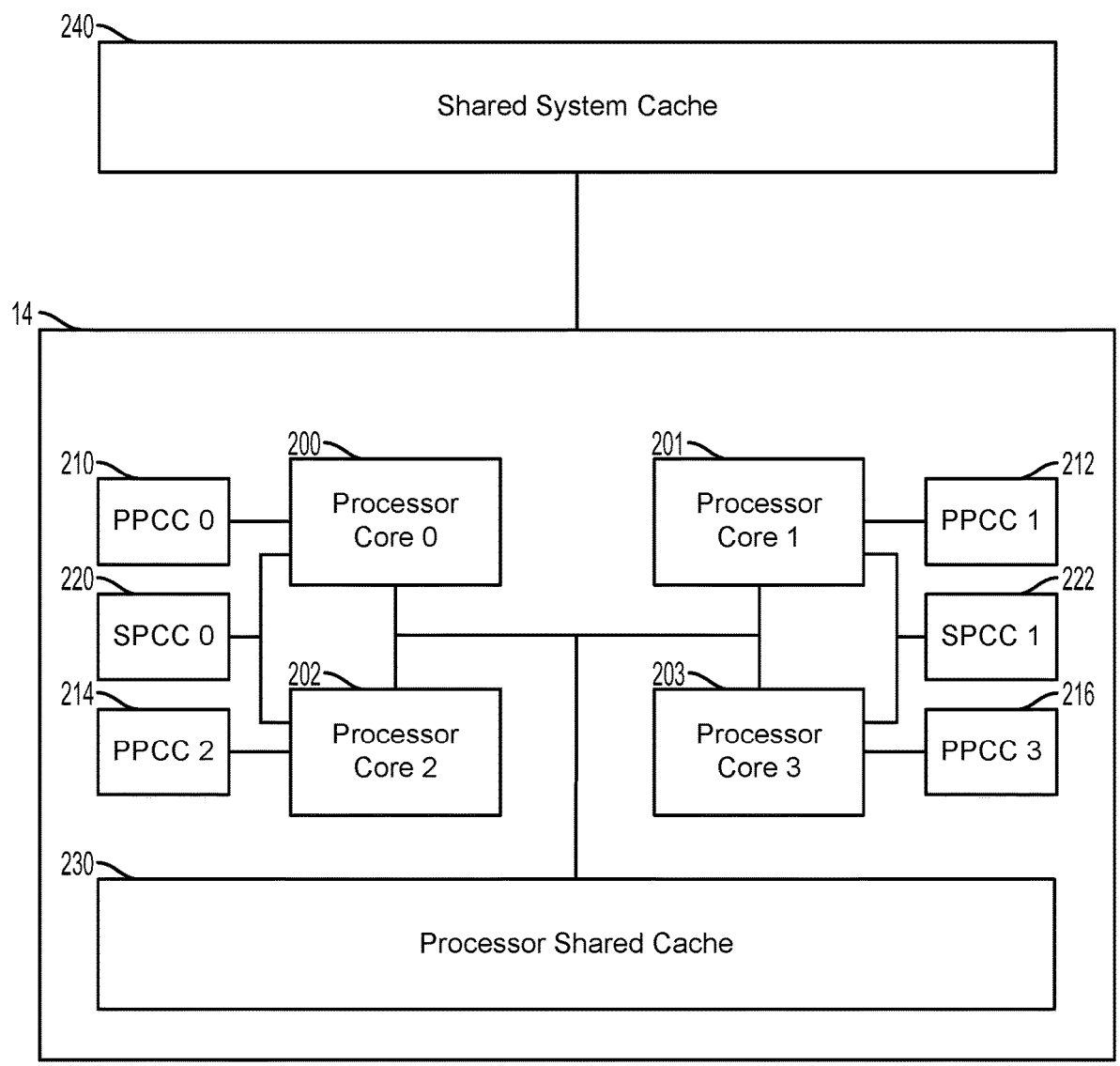
FIG. 2 is a component block diagram illustrating an example multicore processor suitable for implementing various embodiments.

FIG. 2 illustrates components of a computing device suitable for implementing an embodiment. The processor 14 may include multiple processor types, including, for example, a CPU and various hardware accelerators, such as a GPU, a DSP, an APU, an SPU subsystem processor, etc. The processor 14 may also include a custom hardware accelerator, which may include custom processing hardware and/or general purpose hardware configured to implement a specialized set of functions. The processors 14 may include any number of processor cores 200, 201, 202, 203. A processor 14 having multiple processor cores 200, 201, 202, 203 may be referred to as a multicore processor.

The processor 14 may have a plurality of homogeneous or heterogeneous processor cores 200, 201, 202, 203. A homogeneous processor may include a plurality of homogeneous processor cores. The processor cores 200, 201, 202, 203 may be homogeneous in that, the processor cores 200, 201, 202, 203 of the processor 14 may be configured for the same purpose and have the same or similar performance characteristics. For example, the processor 14 may be a general purpose processor, and the processor cores 200, 201, 202, 203 may be homogeneous general purpose processor cores. As another example, the processor 14 may be a GPU, and the processor cores 200, 201, 202, 203 may be homogeneous graphics processor cores. As another example, the processor 14 may be a DSP, and the processor cores 200, 201, 202, 203 may be homogeneous digital signal processor cores. As another example, the processor 14 may be a custom hardware accelerator with homogeneous processor cores 200, 201, 202, 203.

A heterogeneous processor may include a plurality of heterogeneous processor cores. The processor cores 200, 201, 202, 203 may be heterogeneous in that the processor cores 200, 201, 202, 203 of the processor 14 may be configured for different purposes and/or have different performance characteristics. The heterogeneity of such heterogeneous processor cores may include different instruction set architecture. The heterogeneity of such heterogeneous processor cores may include different pipelines. The heterogeneity of such heterogeneous processor cores may include different operating frequencies. The heterogeneity of such heterogeneous processor cores may include other different configuration features of processor cores. An example of such heterogeneous processor cores may include what are known as "big.LITTLE" architectures in which slower, low-power processor cores may be coupled with more powerful and power-hungry processor cores. In similar embodiments, an SoC (for example, SoC 12 of FIG. 1) may include any number of homogeneous or heterogeneous processors 14. In various embodiments, not all off the processor cores 200, 201, 202, 203 need to be heterogeneous processor cores, as a heterogeneous processor may include any combination of processor cores 200, 201, 202, 203 including at least one heterogeneous processor core.

Each of the processor cores 200, 201, 202, 203 of a processor 14 may be designated a private processor core cache (PPCC) memory 210, 212, 214, 216 that may be dedicated for read and/or write access by a designated processor core 200, 201, 202, 203. The private processor core cache 210, 212, 214, 216 may store data and/or instructions, and make the stored data and/or instructions available to the processor cores 200, 201, 202, 203, to which the private processor core cache 210, 212, 214, 216 is dedicated, for use in execution by the processor cores 200, 201, 202, 203. The private processor core cache 210, 212, 214, 216 may include volatile memory as described herein with reference to memory 16 of FIG. 1.

Groups of the processor cores 200, 201, 202, 203 of a processor 14 may be designated a shared processor core cache (SPCC) memory 220, 222 that may be dedicated for read and/or write access by a designated group of processor core 200, 201, 202, 203. The shared processor core cache 220, 222 may store data and/or instructions, and make the stored data and/or instructions available to the group processor cores 200, 201, 202, 203 to which the shared processor core cache 220, 222 is dedicated, for use in execution by the processor cores 200, 201, 202, 203 in the designated group. The shared processor core cache 220, 222 may include volatile memory as described herein with reference to memory 16 of FIG. 1.

The processor 14 may include a shared processor cache memory 230 that may be dedicated for read and/or write access by the processor cores 200, 201, 202, 203 of the processor 14. The shared processor cache 230 may store data and/or instructions, and make the stored data and/or instructions available to the processor cores 200, 201, 202, 203, for use in execution by the processor cores 200, 201, 202, 203. The shared processor cache 230 may also function as a buffer for data and/or instructions input to and/or output from the processor 14. The shared cache 230 may include volatile memory as described herein with reference to memory 16 (FIG. 1).

Multiple processors 14 may access a shared system cache memory 240 that may be dedicated for read and/or write access by the processor cores 200, 201, 202, 203 of the multiple processors 14. The shared system cache 240 may store data and/or instructions and make the stored data and/or instructions available to the processor cores 200, 201, 202, 203 for use in execution by the processor cores 200, 201, 202, 203. The shared system cache 240 may also function as a buffer for data and/or instructions input to and/or output from the multiple processors 14. The shared system cache 240 may include volatile memory as described herein with reference to memory 16 illustrated in FIG. 1.

In the example illustrated in FIG. 2, the processor 14 includes four processor cores 200, 201, 202, 203 (i.e., processor core 0, processor core 1, processor core 2, and processor core 3). In the example, each processor core 200, 201, 202, 203 is designated a respective private processor core cache 210, 212, 214, 216 (i.e., processor core 0 and private processor core cache 0, processor core 1 and private processor core cache 1, processor core 2 and private processor core cache 2, and processor core 3 and private processor core cache 3). The processor cores 200, 201, 202, 203 may be grouped, and each group may be designated a shared processor core cache 220, 222 (i.e., a group of processor core 0 and processor core 2 and shared processor core cache 0, and a group of processor core 1 and processor core 3 and shared processor core cache 1). For ease of explanation, the examples herein may refer to the four processor cores 200, 201, 202, 203, the four private processor core caches 210, 212, 214, 216, two groups of processor cores 200, 201, 202, 203, and the shared processor core cache 220, 222 illustrated in FIG. 2. However, the four processor cores 200, 201, 202, 203, the four private processor core caches 210, 212, 214, 216, two groups of processor cores 200, 201, 202, 203, and the shared processor core cache 220, 222 illustrated in FIG. 2 and described herein are merely provided as an example and in no way are meant to limit the various embodiments to a four-core processor system with four designated private processor core caches and two designated shared processor core caches 220, 222. The computing device 10, the SoC 12, or the processor 14 may individually or in combination include fewer or more than the four processor cores 200, 201, 202, 203 and private processor core caches 210, 212, 214, 216, and two shared processor core caches 220, 222 illustrated and described herein.

In various embodiments, a processor core 200, 201, 202, 203 may access data and/or instructions stored in the shared processor core cache 220, 222, the shared processor cache 230, and/or the shared system cache 240 indirectly through access to data and/or instructions loaded to a higher level cache memory from a lower level cache memory. For example, levels of the various cache memories 210, 212, 214, 216, 220, 222, 230, 240 in descending order from highest level cache memory to lowest level cache memory may be the private processor core cache 210, 212, 214, 216, the shared processor core cache 220, 222, the shared processor cache 230, and the shared system cache 240. In various embodiments, data and/or instructions may be loaded to a cache memory 210, 212, 214, 216, 220, 222, 230, 240 from a lower level cache memory and/or other memory (e.g., memory 16, 24 illustrated in FIG. 1) as a response to a miss the cache memory 210, 212, 214, 216, 220, 222, 230, 240 for a memory access request, and/or as a response to a prefetch operation speculatively retrieving data and/or instructions for future use by the processor core 200, 201, 202, 203. In various embodiments, the cache memory 210, 212, 214, 216, 220, 222, 230, 240 may be managed using an eviction policy to replace data and/or instructions stored in the cache memory 210, 212, 214, 216, 220, 222, 230, 240 to allow for storing other data and/or instructions. Evicting data and/or instructions may include writing the evicted data and/or instructions evicted from a higher level cache memory 210, 212, 214, 216, 220, 222, 230 to a lower level cache memory 220, 222, 230, 240 and/or other memory.

For ease of reference, the terms "hardware accelerator," "custom hardware accelerator," "multicore processor," "processor," and "processor core" may be used interchangeably herein. The descriptions herein of the illustrated computing device and its various components are only meant to be exemplary and in no way limiting. Several of the components of the illustrated example computing device may be variably configured, combined, and separated. Several of the components may be included in greater or fewer numbers, and may be located and connected differently within the SoC or separate from the SoC.

Figure 3:
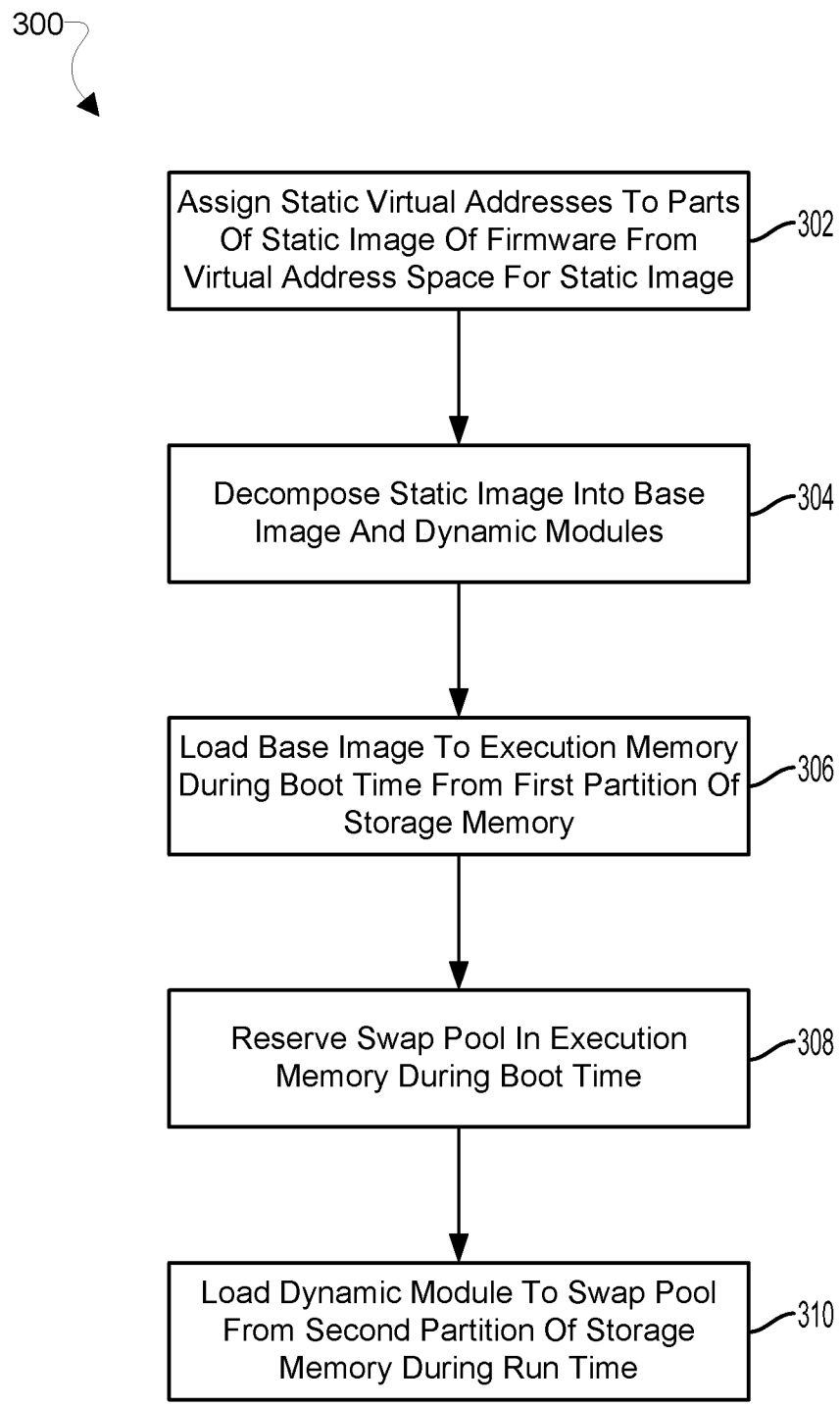
FIG. 3 is a process flow diagram illustrating a method for external paging and swapping for dynamic modules according to some embodiments.

FIG. 3 illustrates a method 300 for external paging and swapping for dynamic modules according to some embodiments. The method 300 may be implemented in a computing device (e.g., computing device 10 in FIG. 1). The method 300 may be implemented in software executing in a processor (e.g., processor 14, 200, 201, 202, 204 in FIGS. 1, 2, 5, and 7), in general purpose hardware, in dedicated hardware, or in a combination of a software-configured processor and dedicated hardware, such as a processor executing software within a system for external paging and swapping for dynamic modules that includes other individual components. The individual components may include a memory 16, 24 in FIG. 1, cache memory 210, 212, 214, 216, 220, 222, 230, 240 in FIG. 2. The individual components may include an execution memory 500 and a storage memory 502 in FIGS. 5 and 7), and various memory/cache controllers. In order to encompass the alternative configurations enabled in various embodiments, the hardware implementing the method 300 is referred to herein as a "processing device."

In block 302, the processing device may assign static virtual addresses to parts of a static image (e.g., static image 400 in FIG. 4) of firmware of a computing device from a virtual address space for the static image. The static image may include various parts including a base image of code and/or data for firmware required to run necessary functions of the computing device. The base image may include base image 402 of FIGS. 4 and 5. The base image may include the compressed base image 700 of FIG. 7. Necessary functions may include any function of the computing device required to operate the computing device at a level at which other functions of the computing device may be implemented. The static image may include dynamic modules of firmware that may be implemented by the computing device operating at the level enabled by the functions of the base image. Each dynamic module may include a code module (e.g., code modules 404a-404d in FIGS. 4, 5, and 7). In various embodiments, a dynamic module may further include a data module, related to the code module, for implementing the firmware functions of the dynamic modules. The data module may include a data module 406a-406d of FIGS. 4 and 5. The data module may include a compressed metadata of a code module included in the compressed base image 700 of FIG. 7. For example, the dynamic modules may enable the execution of functions of various radio access technologies of a computing device. During composition of the static virtual image, boundaries may be specified for the base image and the various dynamic modules. The static virtual address may be assigned to the base image and the various dynamic modules based on these specified boundaries. The static virtual address assigned to the various parts of the static firmware image may be immutable and may be used by the computing device to identify the base image and the dynamic modules from each other. In various embodiments, the base image and/or the dynamic modules may be uncompressed or compressed. The static virtual addresses may also be associated with an indicator and/or within a set of virtual addresses of the virtual address space for the static image that may indicate whether the base image and/or dynamic modules are uncompressed or compressed.

The static virtual addresses may allow the computing device, for example via a memory management unit of the computing device, to associate the static virtual addresses with physical block addresses of a storage memory of the computing device and with physical addresses of an execution memory of the computing device. In some embodiments, the associations of the static virtual addresses with the physical block addresses and/or with the physical addresses may be stored as mappings between addresses in any number of data structures. Identification of the part of the static image using the virtual addresses may be used to identify a portion or partition of the storage memory in which to store the base image and/or dynamic modules. The partition may include a base image partition 506 of FIGS. 5 and 7. The partition may include a paging partition 508 of FIGS. 5 and 7. The partition may include a swap pool partition 510 of FIG. 5. Identification of the part of the static image using the virtual addresses may be used to identify a location in the execution memory to which to load the parts of the static image, including locations for the base image and a swap pool (e.g., swap pool 504 in FIGS. 5 and 7) configured for dynamic loading of the dynamic modules.

In block 304, the processing device may decompose the static image into the base image and the dynamic modules. As discussed herein, the static virtual addresses assigned to the parts of the static image may identify the parts of the static virtual images, including the base image and the dynamic modules. The processing device may identify the base image and the dynamic modules and separate the base image and the dynamic modules from the static image and each other. The processing device may be configured to manage storage of the decomposed parts of the static virtual image to partitions of the storage memory. The storage memory may include partitions sized and designated to store the base image separately from the dynamic modules, such as in a first partition. The storage memory may include partitions sized and designated to store parts of the dynamic modules separately from each other, such as storing the code modules separately from the data modules in a second partition and a third partition. In various embodiments, the second partition and the third partition may be interchangeably designated for storing the code modules and the data modules. In other words, in some embodiments either the second partition or the third partition may be a paging partition for storing the code modules, and in some embodiments either the second partition or the third partition may be a swap pool partition for storing the data modules.

In block 306, the processing device may load the base image to the execution memory from the first partition of the storage memory during a boot time of the computing device. During the boot time, the processing device may load various firmware code and/or data for execution to place the computing device in a condition at which it is functional to execute other functions of the computing device, such as functions that encompass the intended use of the computing device. The base image may include the firmware code and/or data configured to place the computing device in such a condition and it is therefore important to load the base image during boot time. The processing device may use the static virtual addresses of the base image mapped to the physical block addresses of the first partition in the storage memory to retrieve the base image from the storage memory. The processing device may map the static virtual addresses to the physical addresses of the execution memory for storing the base image so that the firmware code and/or data of the base image may be accessible for execution.

During the boot time of the computing device, the processing device may reserve a portion of the execution memory for use as a swap pool in block 308. The swap pool may be a portion of the execution memory reserved and configured for paging and/or swapping of the dynamic modules. In various embodiments, the size of the swap pool may be set to accommodate the largest dynamic module in an uncompressed or compressed form. For example, the swap pool may be sized to be able to store the largest uncompressed or compressed code module. The swap pool may also be sized to further store a data module associated with the largest uncompressed or compressed code module. As such, the swap pool may be sufficiently sized to store any of the smaller uncompressed or compressed code modules and/or data modules.

In block 310, the processing device may load a dynamic module to the swap pool from the second partition of the storage memory during a run time of the computing device. A run time may be a period during which the computing device may execute the functions that encompass the intended use of the computing device. To execute the functions that encompass the intended use of the computing device, the computing device may execute the dynamic modules. A dynamic module may be loaded to the swap pool for access to the code and/or data of the dynamic module for execution by the computing device. As described further herein, loading the dynamic module may include loading an entire dynamic module or loading any number of pages of the dynamic module associated with particular functions for execution by the computing device. Loading the dynamic module may include locating the dynamic module from a mapping of its static virtual address to a physical block address in the second partition, and mapping the static virtual address to the physical address in the swap pool.

In some embodiments, the processing device may implement any combination of blocks 302-310 during or at different states of the computing device. A state of the computing device may include a compile and/or link time. A state of the computing device may include a boot time. A state of the computing device may include a run time. For example, blocks 302 and 304 may be implemented during compile and/or link time, blocks 306 and 308 may be implemented during boot time, and block 310 may be implemented during run time.

Figure 4:
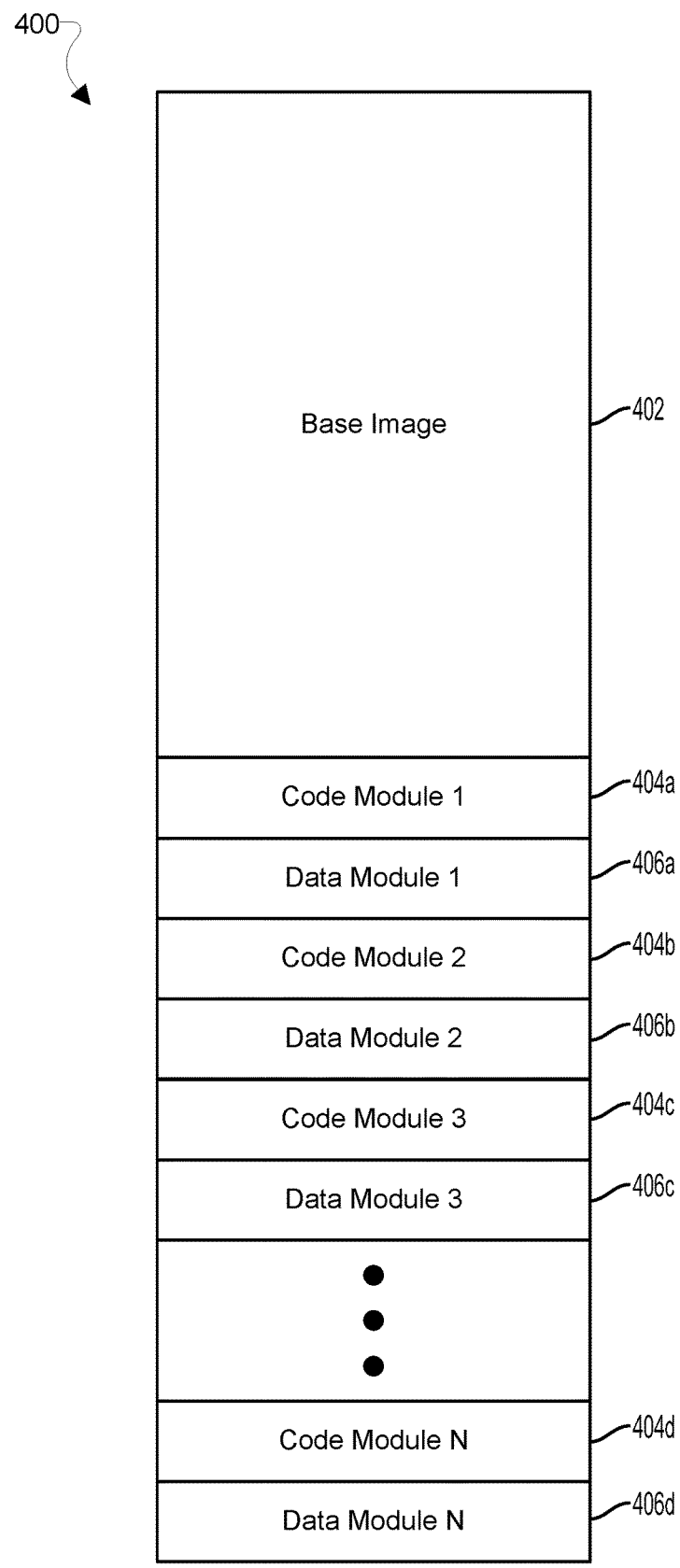
FIG. 4 is a block diagram illustrating a static image of firmware of a computing device according to some embodiments.

FIG. 4 illustrates a static image 400 of firmware of a computing device (e.g., computing device 10 in FIG. 1) according to some embodiments. The static image 400 may be a single image of various firmware of the computing device, including up to all of the firmware of the computing device. The static image 400 may include a base image 402 of code and/or data for firmware required to run necessary functions of the computing device. The static image 400 may include any number "N" of dynamic modules. Each dynamic module may include a code module 404a, 404b, 404c, 404d for implementing the firmware functions of the dynamic modules. In some embodiments, a dynamic module may further include a data module 406a, 406b, 406c, 406d, related to the code module 404a, 404b, 404c, 404d, for implementing the firmware functions of the dynamic modules. Boundaries may be specified for the base image 402 and various code modules 404a, 404b, 404c, 404d to define each in the static image 400. In various embodiments, boundaries may be specified for the data modules 406a, 406b, 406c, 406d to define each in the static image 400. In various embodiments, any of the base image 402 and/or the dynamic modules 404a-404d, 406a-406d may be uncompressed or compressed.

The base image 402 and the dynamic modules 404a-404d, 406a-406d may be assigned static virtual addresses from a virtual address space for the static image. For example, a dynamic module 404a-404d, 406a-406d may be assigned static virtual addresses for its code module 404a, 404b, 404c, 404d. A dynamic module 404a-404d, 406a-406d may be assigned static virtual addresses for its data module 406a, 406b, 406c, 406d that is related to its code module 404a, 404b, 404c, 404d. The static virtual addresses may also be associated with an indicator and/or within a set of virtual addresses of the virtual address space for the static image that may indicate whether the base image 402 and/or the dynamic modules 404a-404d, 406a-406d are uncompressed or compressed. The static virtual addresses may allow the computing device, for example via a memory management unit of the computing device, to associate the static virtual addresses with physical block addresses of a storage memory of the computing device and with physical addresses of an execution memory of the computing device. The storage memory may include the memory 16 of FIG. 1. The storage memory may include the memory 24 of FIG. 1. The storage memory may include the storage memory 502 of FIGS. 5 and 7. The execution memory may include the memory 16 of FIG. 1. The execution memory may include the memory 24 of FIG. 1. The execution memory may include the cache memory 210, 212, 214, 216, 220, 222, 230, 240 of FIG. 2. The execution memory may include the execution memory 500 of FIGS. 5 and 7. Identification of the part of the static image 400 using the virtual addresses may be used to identify a portion or partition of the storage memory in which to store the base image 402 and/or the dynamic modules 404a-404d, 406a-406d. The partition may include a base image partition 506 of FIGS. 5 and 7. The partition may include a paging partition 508 of FIGS. 5 and 7. The partition may include a swap pool partition 510 of FIG. 5. Identification of the part of the static image 400 using the virtual addresses may be used to identify a location in the execution memory to which to load the parts of the static image 400, including locations for the base image and a swap pool (e.g., swap pool 504 in FIG. 5) configured for dynamic loading of the dynamic modules 404a-404d, 406a-406d. In various embodiments, the static virtual addresses may be associated with physical block addresses of the storage memory and with physical addresses of the execution memory in any number of data structures, such as translation lookaside buffers. In various embodiments, the static virtual addresses may be associated with a compression indicator configured to indicate whether the base image 402 and/or the dynamic modules 404a-404d, 406a-406d are uncompressed or compressed. The compression indicator association may be included in the data structures associating the static virtual addresses with the physical block addresses and/or physical addresses, or in separate data structures.

Figure 5:
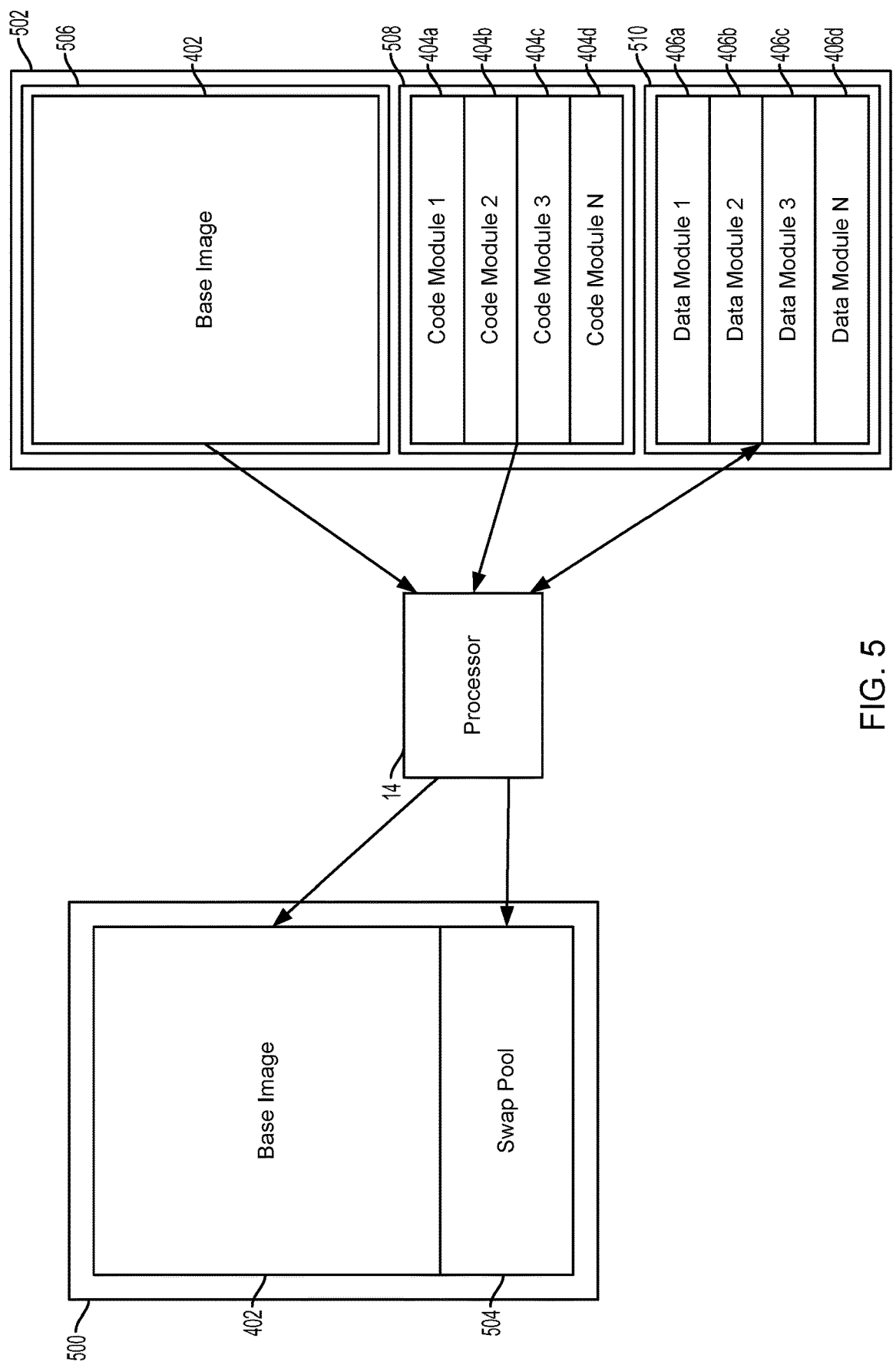
FIG. 5 is a component block diagram illustrating a memory management system suitable for implementing external paging and swapping for dynamic modules according to some embodiments.

FIG. 5 illustrates a memory management system suitable for implementing external paging and swapping for dynamic modules according to some embodiments. The memory management system may include an execution memory 500, a storage memory 502, and a processor 14. The execution memory 500 may include the memory 16 of FIG. 1. The execution memory 500 may include the memory 24 of FIG. 1. The execution memory 500 may include the cache memory 210, 212, 214, 216, 220, 222, 230, 240 of FIG. 2. The storage memory 502 may include the memory 16 of FIG. 1. The storage memory 502 may include the memory 24 of FIG. 1.

The storage memory 502 may be configured to store the base image 402 and/or the dynamic modules 404a-404d, 406a-406d. The storage memory 502 may be divided into partitions. A partition may include a base image partition 506. A partition may include a paging partition 508. A partition may include a swap pool partition 510. The base image 402 may be stored to the base image partition 506. The code modules 404a-404b may be stored to the paging partition 508. The data modules 406a-406b may be stored to the swap pool partition 510. To store the base image 402 and/or the dynamic modules 404a-404d, 406a-406d, the static virtual addresses of the base image 402 and/or the dynamic modules 404a-404d, 406a-406d may be mapped to the physical block addresses of the storage memory 502, and specifically to the physical block addresses of the partitions 506, 508, 510. The static virtual addresses and the physical block addresses of the storage memory 502 may be mapped in a data structure.

In various embodiments, the code modules 404a-404b may be divided into pages. Any number of the code module pages may be associated with specific functions of the firmware of the code modules 404a-404b. In various embodiments, a data module 406a-406b in the storage memory 502 may initially contain little to no data until a related code module 404a-404b is executed at run time. The data stored in a data module 406a-406b may be preserved only so long as it is needed, and may initially contain little to no data for subsequent run time sessions. In various embodiments, any combination of the base image 402 and/or the dynamic modules 404a-404d, 406a-406d stored in the storage memory 502 may be stored in an uncompressed or compressed format.

The execution memory 500 may be configured to store the base image 402 and contain a reserved area of memory referred to herein as a swap pool 504. The base image 402 may be loaded to the execution memory 500 by the processor 14 from the base image partition 506 in the storage memory 502 during a boot time of the computing device (e.g., computing device 10). The swap pool 504 may be reserved in the execution memory 500 by the processor 14 during the boot time of the computing device. The processor 14 may configure the size of the swap pool 504. In various embodiments, the processor may be configured to size the swap pool 504 as large as the largest uncompressed or compressed code module 404a-404d. In sizing the swap pool 504, the processor 14 may account for a size of a data module 406a-406d associated with the largest code module 404a-404d. The swap pool 504 may therefore be sized such that any of the compressed or uncompressed code modules 404a-404d may fit in the swap pool 504. In various embodiments, a swap pool 504 sized for a largest uncompressed code module 404a-404d may accommodate any of the other uncompressed code modules 404a-404d. A swap pool 504 sized for a largest compressed code module 404a-404d may accommodate any uncompressed code modules 404a-404d smaller than the largest compressed code module 404a-404d, and any code modules 404a-404d larger than the largest compressed code module 404a-404d may also be compressed.

In various embodiments, a code module 404a-404d or any number of pages of a code module 404a-404d may be loaded to the swap pool 504. To load the code module 404a-404d, the static virtual addresses of the code module 404a-404d may be mapped to the physical addresses of the swap pool 504. The static virtual addresses and the physical addresses of the swap pool 504 may be mapped in a data structure. The data structure may include a memory address lookup table stored in memory. The data structure may include a memory address translation table stored in memory. In various embodiments, the code module 404a-404d may be loaded to the swap pool 504 in response to a demand or request from a thread executing on the computing device and/or predictively based on various states of the computing device relating to uses cases for the computing device. The states representing the uses cases may be associated to the code module 404a-404d in a data structure, such as a table, stored in the computing device. In various embodiments, the associations of the states and the code module 404a-404d may be provided to the computing device and/or learned by the computing device. Associations of states and code modules 404a-404d may be determined by offline and/or online code analysis and/or machine learning from simulations and/or run time executions.

In various embodiments, a compressed code module 404a-404d may be decompressed by the processor 14, which may execute a compression engine, as part of loading the compressed code module 404a-404d to the swap pool 504. The processor 14 may use the static virtual address of a code module 404a-404d to determine whether it is compressed. In various embodiments, the static virtual address may be associated in a data structure with a compression indicator configured to indicate whether the code module 404a-404d is uncompressed or compressed. In various embodiments, the processor 14 may associate a range of static virtual addresses with uncompressed or compressed code modules 404a-404d and determine whether the static virtual address of a code module 404a-404d falls in the range of static virtual addresses.

The various code modules 404a-404d may have different priorities. While executing a first code module 404a-404d, a second code module 404a-404d with a higher priority may be requested to load and/or predictively loaded. The executing first code module 404a-404d may be interrupted and evicted from the swap pool 504. Because the swap pool 504 is deliberately limited in size to reduce the need for memory resources for having all of the code modules 404a-404d loaded to the execution memory 500, the swap pool 504 must be managed so that lower priority code modules 404a-404d are not interfering with the execution of the higher priority code modules 404a-404d. Any combination of memory management techniques may be used to determine which code modules 404a-404d to evict from the swap pool 504. A memory management technique may be priority based. A memory management technique may be time based. A memory management technique may be usage based.

While executing, a code module 404a-404d loaded to the swap pool 504 may generate context or state data that may be used to resume execution the code module 404a-404d if interrupted and/or for later executions of the code module 404a-404d. The context or state data generated by execution of the code module 404a-404d may be stored to an associated data module 406a-406d in the swap pool partition 510 of the storage memory 502. The context or state data may be stored by the processor 14 using the mapping of the static virtual address of the data module 406a-406d to the physical block address of the storage memory 502. The static virtual addresses and the physical block addresses of the storage memory 502 may be mapped in a data structure. The data structure may include a memory address lookup table stored in memory. The data structure may include a memory address translation table stored in memory. Upon resuming execution of the code module 404a-404d and/or for later executions of the code module 404a-404d, the processor 14 may load the data module 406a-406d using the mapping of the static virtual address of the data module 406a-406d to the physical block address of the storage memory 502. In various embodiments, the static virtual addresses of the code module 404a-404d and the data module 406a-406d may be associated in a data structure such that the processor 14 may determine which data module 406a-406d to load for the execution of the code module 404a-404d.

Figure 6:
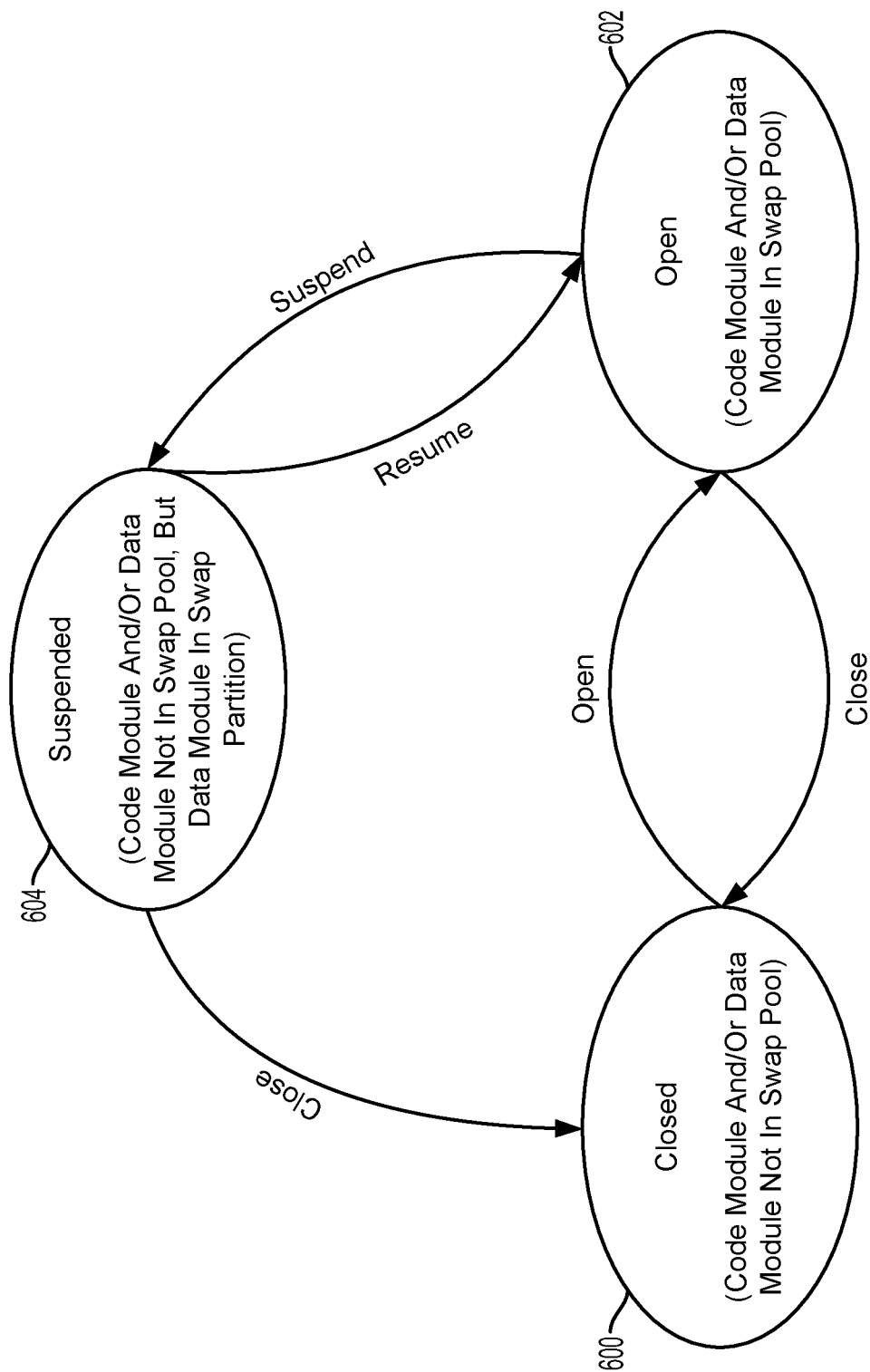
FIG. 6 is a state diagram illustrating states of a code module from implementing external paging and swapping for dynamic modules according to some embodiments.

FIG. 6 illustrates states 600, 602, 604 of a dynamic module from implementing external paging and swapping for dynamic modules according to some embodiments. A dynamic module may include a code module 404a, 404b, 404c, 404d of FIGS. 4, 5, and 7. In some embodiments, a dynamic module may further include a data module 406a, 406b, 406c, 406d of FIGS. 4 and 5, related to the code module 404a, 404b, 404c, 404d. An initial state for a dynamic module may be a closed state 600, which may indicate that the dynamic module is not loaded to the swap pool (e.g., swap pool 504 in FIG. 5) in the execution memory of the computing device (e.g., computing device 10 in FIG. 1). The execution memory may include the memory 16 of FIG. 1. The execution memory may include the memory 24 of FIG. 1. The execution memory may include the cache memory 210, 212, 214, 216, 220, 222, 230, 240 of FIG. 2. The execution memory may include the execution memory 500 of FIGS. 5 and 7. During the closed state 600, a code module may be stored in the paging partition in the storage memory of the computing device. The storage memory may include the memory 16 of FIG. 1. The storage memory may include the memory 24 of FIG. 1. The storage memory may include the storage memory 502 of FIGS. 5 and 7. The code module may be inaccessible for execution in the closed state 600.

From a closed state 600, a dynamic module may transition to an open state 602. The transition may occur in response to a demand responsive or predictive loading of the dynamic to the swap pool in the execution memory. During the open state 602, the dynamic module may be stored in the swap pool in the execution memory. The dynamic module may be accessible for execution in the open state 602. Upon completion or interruption of execution of the dynamic module where data generated by the execution of the dynamic module is not needed to resume execution or for later execution of the dynamic module, the dynamic module may transition back to the closed state 600.

Upon completion or interruption of execution of the dynamic module where data generated by the execution of the dynamic module is needed to resume execution or for later execution of the dynamic module, the dynamic module may transition to a suspended state 604. The transition may occur in response to eviction of the dynamic module from the swap pool. The suspended state 604 may indicate that the dynamic module is not loaded to the swap pool in the execution. During a suspended state 604, a code module may be stored in the paging partition in the storage memory. The dynamic module may be inaccessible for execution in the suspended state 604. Also, a data module associated with the code module may be stored in the swap pool partition (e.g., swap pool partition 510 in FIG. 5) in the storage memory, and may be loaded to the swap pool upon transition to an open state 602 for the code module. Storing the data module during the suspended state 604 may increase the speed with which transitions between executions of code modules may be accomplished, such as switching between radio access technologies in a computing device. In various embodiments, the dynamic module may transition from the suspended state 604 to the open state 602 responsive to a demand for the dynamic module, predictively, and/or opportunistically based on availability of space in the swap pool. The dynamic module may also transition to the closed state 600, at which point the data module may no longer be stored in the swap pool partition. The transition to the closed state 600 may be trigger by an elapsed time or change in state of the computing device for which the data module may be stale or unnecessary.

Figure 7:
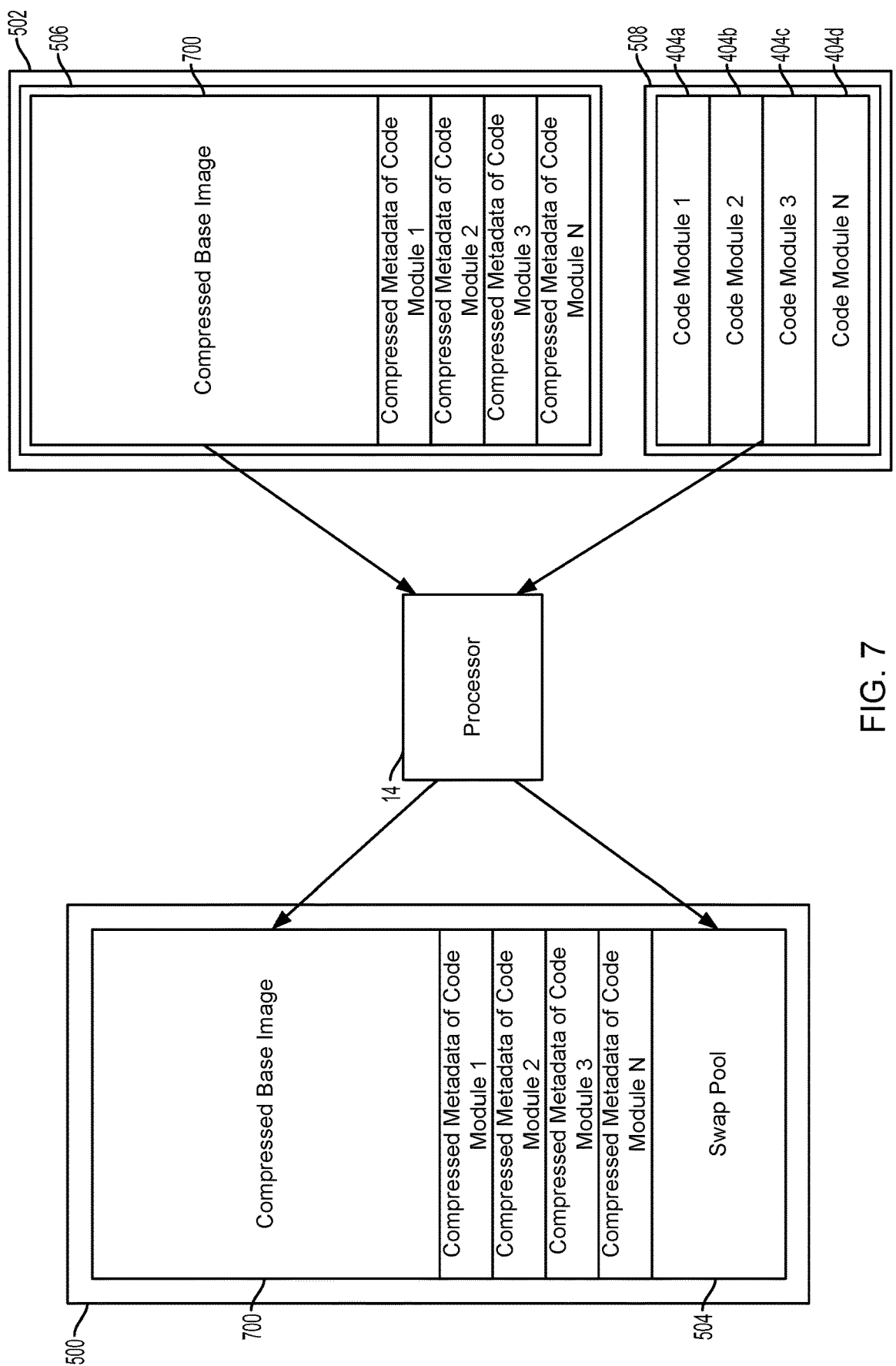
FIG. 7 is a component block diagram illustrating a memory management system suitable for implementing external paging and swapping for dynamic modules according to some embodiments.

FIG. 7 illustrates a memory management system suitable for implementing external paging and swapping for dynamic modules according to some embodiments. The memory management system may include an execution memory 500, a storage memory 502, and a processor 14. The execution memory may include the memory 16 of FIG. 1. The execution memory may include the memory 24 of FIG. 1. The execution memory may include the cache memory 210, 212, 214, 216, 220, 222, 230, 240 of FIG. 2. The storage memory may include the memory 16 of FIG. 1. The storage memory may include the memory 24 of FIG. 1.

The storage memory 502 may be configured to store a compressed base image 700, which may include uncompressed or compressed metadata of various code modules, and/or configured to store the dynamic modules, including the code modules 404a-404d. The storage memory 502 may be divided into partitions. A partition may include a base image partition 506. A partition may include a paging partition 508. The compressed base image 700 may be stored to the base image partition 506. The code modules 404a-404b may be stored to the paging partition 508. In various embodiments, any combination of the code modules 404a-404b stored in the storage memory 502 may be stored in an uncompressed or compressed format. To store the compressed base image 700 and/or the code modules 404a-404b, static virtual addresses of the compressed base image 700 and/or the code modules 404a-404b may be mapped to the physical block addresses of the storage memory 502, and specifically to the physical block addresses of the partitions 506, 508. The static virtual addresses and the physical block addresses of the storage memory 502 may be mapped in a data structure.

The execution memory 500 may be configured to store the compressed base image 700 and contain a swap pool 504. The compressed base image 700 may be loaded to the execution memory 500 by the processor 14 from the base image partition 506 in the storage memory 502 during a boot time of the computing device (e.g., computing device 10). The swap pool 504 may be configured and function in manners similar to those described herein with reference to FIG. 5.

Parts of the compressed base image 700 may be uncompressed by the processor 14 for execution. For example, firmware code and data of the base image portion of the compressed base image 700 may be uncompressed in response to calls to execute portions of the firmware code. The compressed metadata of the code modules may be individually accessed and uncompressed for access to the metadata for execution of a corresponding code module 404a-404d that is loaded to the swap pool 504 and accessed for execution by the processor 14.

Figure 8:
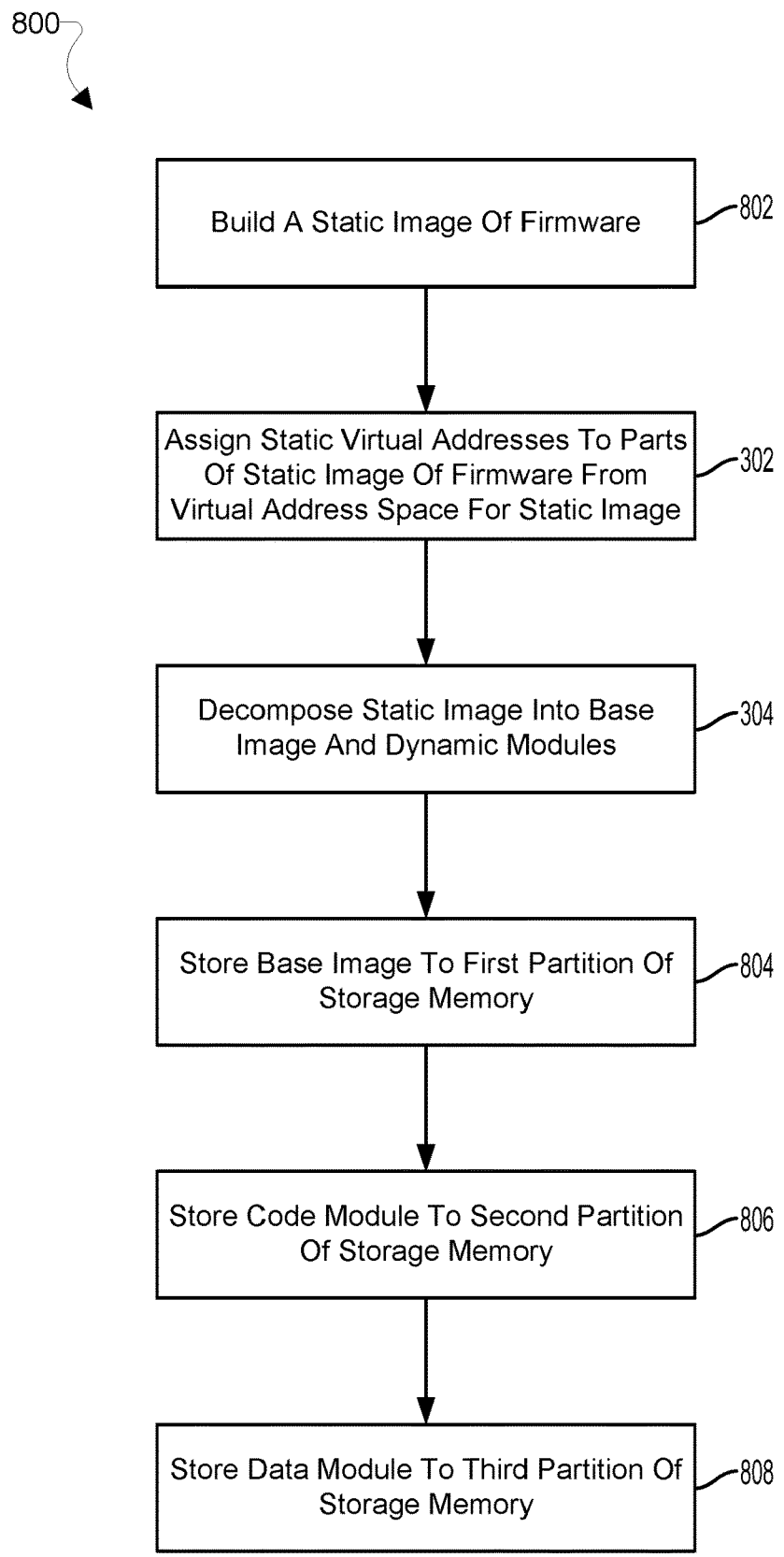
FIG. 8 is a process flow diagram illustrating a method for configuring firmware of a computing device for external paging and swapping for dynamic modules according to some embodiments.

FIG. 8 illustrates a method 800 for configuring firmware of a computing device for external paging and swapping for dynamic modules according to some embodiments. The method 800 may be implemented in a computing device (e.g., computing device 10 in FIG. 1), in software executing in a processor (e.g., processor 14, 200, 201, 202, 204 in FIGS. 1, 2, 5, and 7), in general purpose hardware, in dedicated hardware, or in a combination of a software-configured processor and dedicated hardware, such as a processor executing software within a system for external paging and swapping for dynamic modules that includes other individual components (e.g., memory 16, 24 in FIG. 1, cache memory 210, 212, 214, 216, 220, 222, 230, 240 in FIG. 2, execution memory 500 and storage memory 502 in FIGS. 5 and 7), and various memory/cache controllers. In order to encompass the alternative configurations enabled in various embodiments, the hardware implementing the method 800 is referred to herein as a "processing device."

In block 802, the processing device may build a static image of firmware stored on the computing device. The processing device may make a copy of any combination of the firmware stored on the computing device, up to all of the firmware, and generate a single static image including all of the firmware code and/or data for the static image. Different parts of the static image may be designated by boundaries indicating where certain firmware begin and end in the static image. For example, a boundary may be indicated to separate a base image and a dynamic module (e.g., code modules 404a-404d, data modules 406a-406d in FIGS. 4, 5, and 7). The base image may include the base image 402 of FIGS. 4 and 5. The base image may include the compressed base image 700 of FIG. 7. The dynamic module may include a code module 404a-404d of FIGS. 4, 5, and 7. In some embodiments, the dynamic module may further include a data module 406a-406d of FIGS. 4 and 5, related to the code module. Also, boundaries may be indicated to separate various dynamic modules.

In block 302, the processing device may assign static virtual addresses to parts of a static image (e.g., static image 400 in FIG. 4) of firmware of a computing device from a virtual address space for the static image as described for the like number block of the method 300 with reference to FIG. 3.

In block 304, the processing device may decompose the static image into the base image and the dynamic modules as described for the like number block of the method 300 with reference to FIG. 3.

In block 804, the processing device may store the base image to the first partition of the storage memory (e.g., base image partition 506 in FIGS. 5 and 7). In storing the base image to the first partition of the storage memory, the processing device may map the static virtual addresses of the base image to the physical block addresses of the first partition of the storage memory. In various embodiments, the base image may be stored in uncompressed or compressed formats.

In block 806, the processing device may store the code module to the second partition of the storage memory (e.g., paging partition 508 in FIGS. 5 and 7). In storing the code module to the second partition of the storage memory, the processing device may map the static virtual addresses of the code module to the physical block addresses of the second partition of the storage memory. In various embodiments, the code module may be stored in uncompressed or compressed formats.

In block 808, the processing device may store the data module to the third partition of the storage memory (e.g., swap pool partition 510 in FIG. 5). In storing the data module to the third partition of the storage memory, the processing device may map the static virtual addresses of the data module to the physical block addresses of the third partition of the storage memory. In various embodiments, the data module may be stored in uncompressed or compressed formats.

In some embodiments, the processing device may implement any combination of blocks 302, 304, 802-808 during or at different states of the computing device, such as during or at compile and/or link time, boot time, and/or run time. For example, blocks 302, 304, 802-808 may be implemented during compile and/or link time.

Figure 9:
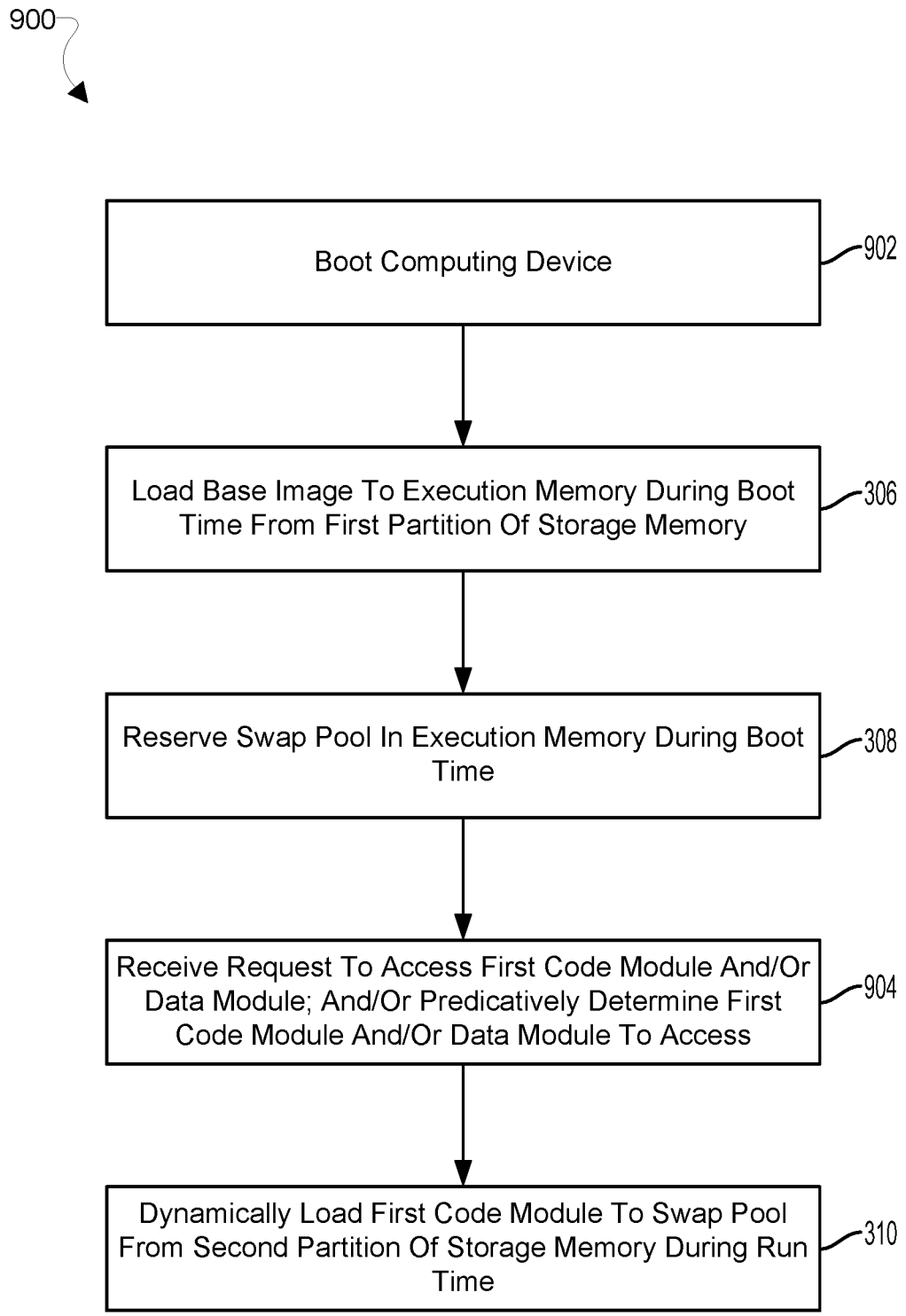
FIG. 9 is a process flow diagram illustrating a method for initializing external paging and swapping for dynamic modules according to some embodiments.

FIG. 9 illustrates a method 900 for initializing external paging and swapping for dynamic modules according to some embodiments. The method 900 may be implemented in a computing device (e.g., computing device 10 in FIG. 1), in software executing in a processor (e.g., processor 14, 200, 201, 202, 204 in FIGS. 1, 2, 5, and 7), in general purpose hardware, in dedicated hardware, or in a combination of a software-configured processor and dedicated hardware, such as a processor executing software within a system for external paging and swapping for dynamic modules that includes other individual components (e.g., memory 16, 24 in FIG. 1, cache memory 210, 212, 214, 216, 220, 222, 230, 240 in FIG. 2, execution memory 500 and storage memory 502 in FIGS. 5 and 7), and various memory/cache controllers. In order to encompass the alternative configurations enabled in various embodiments, the hardware implementing the method 900 is referred to herein as a "processing device."

In block 902, the processing device may boot the computing device. The processing device may boot the computing device in response to a power up or reset of the computing device. The processing device may load a primary boot loader from immutable storage and execute a boot sequence code. The immutable storage may include a memory 16 of FIG. 1. The immutable storage may include a memory 24 of FIG. 1.

In block 306, the processing device may load the base image to the execution memory from the first partition (e.g., base image partition 506 in FIGS. 5 and 7) of the storage memory during a boot time of the computing device as described for the like number block of the method 300 with reference to FIG. 3. The base image may include a base image 402 of FIGS. 4 and 5. The base image may include a compressed base image 700 of FIG. 7.

During the boot time of the computing device, the processing device may reserve a portion of the execution memory for use as a swap pool (e.g., swap pool 504 in FIGS. 5 and 7) in block 308, as described for the like number block of the method 300 with reference to FIG. 3.

In block 904, the processing device may receive a request to access a first code module and/or data module, and/or predicatively determine the first code module and/or data module to access. The processing device may be prompted to retrieve a first code module and/or data module from the storage memory in response to a request received from the computing device to access the first code module and/or data module. The processing device may be configured to predictively retrieve the first code module and/or data module based on states of the computing device indicating use cases of the computing device associated with the first code module and/or data module. The states of the computing device may be associated with the first code module and/or data module in a data structure, and the processing device may recognize the states of the computing device and determine the first code module and/or data module from the association in the data structure.

In block 310, the processing device may load the first code module to the swap pool from a second partition (e.g., paging partition 508 in FIGS. 5 and 7) of the storage memory during a run time of the computing device as described for the like number block of the method 300 with reference to FIG. 3.

In some embodiments, the processing device may implement any combination of blocks 306-310, 902, 904 during different states of the computing device, such as compile and/or link time, boot time, and/or run time. For example, blocks 306, 308, 902 may be implemented during boot time, and blocks 310, 904 may be implemented during run time.

Figure 10:
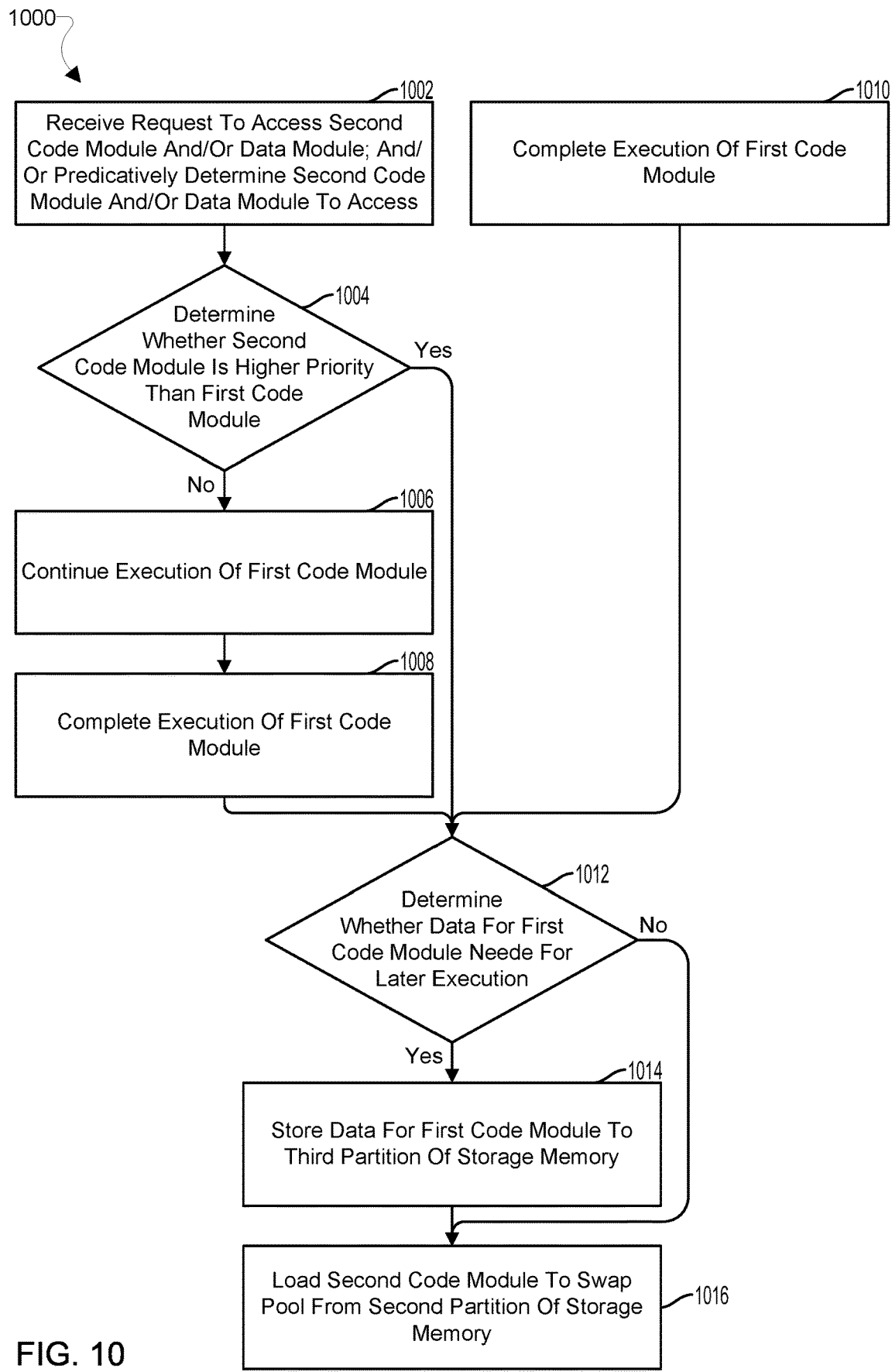
FIG. 10 is a process flow diagram illustrating a method for external paging and swapping for dynamic modules according to some embodiments.

FIG. 10 illustrates a method 1000 for external paging and swapping for dynamic modules according to some embodiments. The method 1000 may be implemented in a computing device (e.g., computing device 10 in FIG. 1), in software executing in a processor (e.g., processor 14, 200, 201, 202, 204 in FIGS. 1, 2, 5, and 7), in general purpose hardware, in dedicated hardware, or in a combination of a software-configured processor and dedicated hardware, such as a processor executing software within a system for external paging and swapping for dynamic modules that includes other individual components (e.g., memory 16, 24 in FIG. 1, cache memory 210, 212, 214, 216, 220, 222, 230, 240 in FIG. 2, execution memory 500 and storage memory 502 in FIGS. 5 and 7), and various memory/cache controllers. In order to encompass the alternative configurations enabled in various embodiments, the hardware implementing the method 1000 is referred to herein as a "processing device."

In block 1002, the processing device may receive a request to access a second code module (e.g., code module 404a-404d in FIGS. 4, 5, and 7) and/or a data module (e.g., data module 406a-406d in FIGS. 4 and 5), and/or predicatively determine a second code module and/or a data module to access. The processing device may be prompted to retrieve a second code module and/or data module from the storage memory in response to a request received from the computing device to access the second code module and/or data module. The processing device may be configured to predictively retrieve the second code module and/or data module based on states of the computing device indicating use cases of the computing device associated with the second code module and/or data module. The states of the computing device may be associated with the second code module and/or data module in a data structure, and the processing device may recognize the states of the computing device and determine the second code module and/or data module from the association in the data structure.

In determination block 1004, the processing device may determine whether the second code module is higher priority than the first code module. Priority of a code module may be determined in various ways. For example, code modules may be assigned priorities that indicate a hierarchy of priority between code modules. In various embodiments, priority may be based on a reference count for a code module in the swap pool (e.g., swap pool 504 in FIGS. 5 and 7) in the execution memory of the computing device, as described herein with reference to the method 1100 in FIG. 11. Priority may also be based on parameters. A parameter of priority may include latency. A parameter of priority may include workload. A parameter of priority may include resource demand. A parameter of priority may include any execution feature or requirement of a code module. Priority may be based on any combination of techniques, algorithms, and/or heuristics to indicate priority.

In response to determining that the second code module is not higher priority than the first code module (i.e., determination block 1004="No"), the processing device may continue to execute the first code module in the swap pool in block 1006.

In either block 1008, following execution of the first code module in block 1006, or in block 1010, the processing device may complete execution of the first code module.

In response to determining that the second code module is higher priority than the first code module (i.e., determination block 1004="Yes"), or after completing execution of the first code module in block 1008 or block 1010, the processing device may determine whether data generated by the execution of the first code module is need for later execution of the first code module in determination block 1012. In various embodiments, the execution of the first code module may have completed on its own, or it may have been interrupted by a higher priority second code module. The first code module may have generated context and/or state data during execution that may be needed or may speed up subsequent executions of the first code module. Such subsequent executions may include a resumption of a prior execution that was interrupted. Subsequent executions may include a new execution of the first code module. Whether the data generated by the execution of the first code module is needed by a later execution of the first code module may be predetermined and indicated by a data in the metadata of the first code module. The processing device may read the data in the metadata of the first code module to determine whether the data generated by the execution of the first code module is needed by a later execution of the first code module.

In response to determining that the data generated by the execution of the first code module is needed by a later execution of the first code module (i.e., determination block 1012="Yes"), the processing device may store the data for the first code module to a third partition (e.g., swap pool partition 510 in FIG. 5) of the storage memory in block 1014. The processing device may store the data to a data module associated with the first code module. The association between the first code module and a data module may be stored in a data structure that may be read by the processing device to determine to which data module to store the data. The static virtual addresses of the data module may be mapped in a data structure to the physical block addresses of the third partition in the storage memory. The processing device may use the mapping of the static virtual addresses and the physical block addresses to store the data.

In response to determining that the data generated by the execution of the first code module is not needed by a later execution of the first code module (i.e., determination block 1012="No"), or following storage of the data for the first code module to the third partition in block 1014, the processing device may load the second code module to the swap pool from the second partition (e.g., paging partition 508 in FIGS. 5 and 7) of the storage memory in block 1016. The second code module may be loaded to the swap pool for access to the code and/or data of the second code module for execution by the computing device. As described further herein, loading the second code module may include loading the entire second code module associated with particular functions for execution by the computing device. Loading the second code module may include loading any number of pages of the second code module associated with particular functions for execution by the computing device. Loading the second code module may include locating the second code module from a mapping of its static virtual address to a physical block address in the second partition and mapping the static virtual address to the physical address in the swap pool.

In some embodiments, the processing device may implement any combination of blocks 1002-1016 during different states of the computing device, such as at or during compile and/or link time, boot time, and/or run time. For example, blocks 1002-1016 may be implemented during run time.

Figure 11:
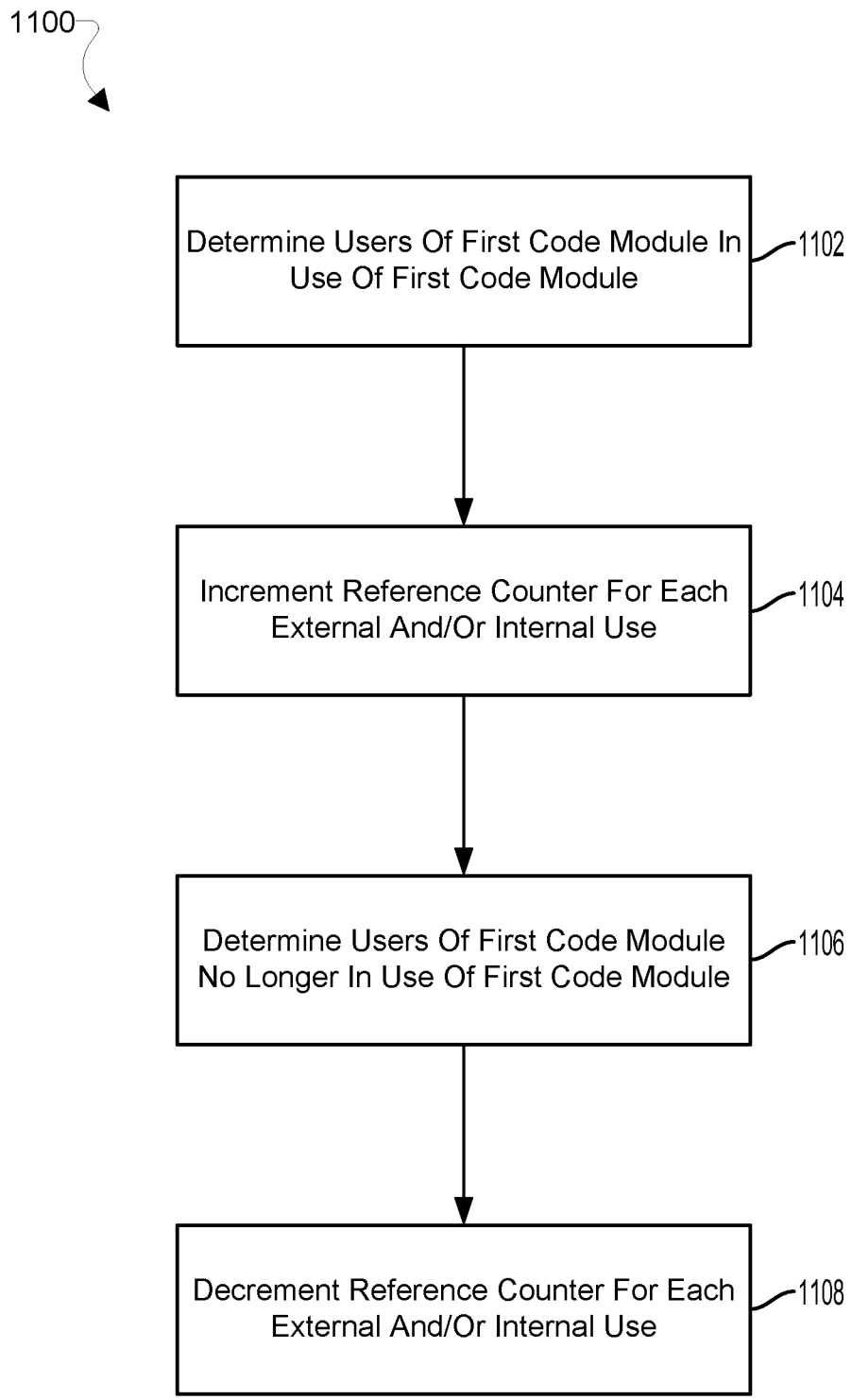
FIG. 11 is a process flow diagram illustrating a method for reference count tracking for external paging and swapping for dynamic modules according to some embodiments.
Figure 12:
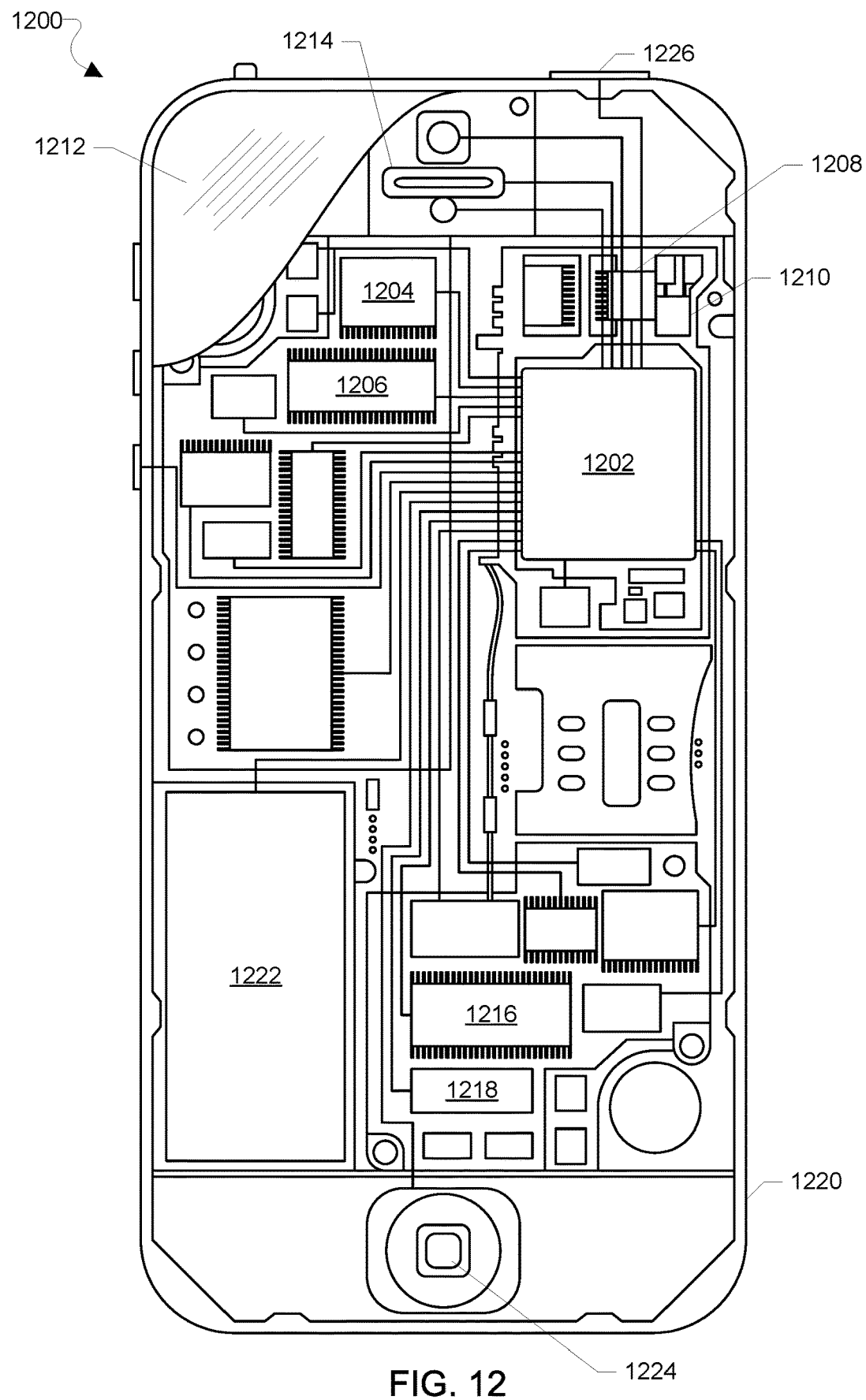
FIG. 12 is a component block diagram illustrating an example mobile computing device suitable for use with the various embodiments.

FIG. 11 illustrates a method 1100 for reference count tracking for external paging and swapping for dynamic modules according to some embodiments. The method 1100 may be implemented in a computing device (e.g., computing device 10 in FIG. 1), in software executing in a processor (e.g., processor 14, 200, 201, 202, 204 in FIGS. 1, 2, 5, and 7), in general purpose hardware, in dedicated hardware, or in a combination of a software-configured processor and dedicated hardware, such as a processor executing software within a system for external paging and swapping for dynamic modules that includes other individual components (e.g., memory 16, 24 in FIG. 1, cache memory 210, 212, 214, 216, 220, 222, 230, 240 in FIG. 2, execution memory 500 and storage memory 502 in FIGS. 5 and 7), and various memory/cache controllers. In order to encompass the alternative configurations enabled in various embodiments, the hardware implementing the method 1100 is referred to herein as a "processing device."

In block 1102, the processing device may determine a user or users of the first code module (e.g., code module 404a-404d in FIGS. 4, 5, and 7) that are in use of the first code module. The user(s) of the first code module may be external users that may include components of the computing device that call for the first code module. The user(s) of the first code module may be internal users that may include processes of the first code module itself that may continue to execute in the background or to complete execution of the first code module following execution for an external user. The processing device may implement a scheduler and/or activity monitor that may identify user(s) of the first code module and whether the first code module is still in use by the user(s).

In block 1104, the processing device may increment a reference counter for each external and/or internal use of the first code module. The reference counter may indicate whether the first code module loaded to the swap pool (e.g., swap pool 504 in FIGS. 5 and 7) is in use. The reference count may be used as or part of the indication of priority of the first code module. For example, the reference count of the first code module may be compared to a priority threshold or to a reference count of another code module to determine whether the reference count of the first code module exceeds the threshold or the other reference count. When the reference count of the first code module exceeds the threshold or the other reference count, the first code module may have a high priority.

In block 1106, the processing device may determine a user(s) of the first code module that are no longer in use of the first code module. The processing device may determine external and/or internal user(s) of the first code module no longer in use of the first code module. Similar to determining the user(s) of the first code module still using the first code module, the processing device may check a scheduler and/or activity monitor to determine whether a user is no longer in use of the first code module.

In block 1108, the processing device may decrement the reference counter for each external and/or internal user of the first code module no longer in use of the first code module. Decreasing the reference counter may change the priority of the first code module. For example, the reference count of the first code module may be compared to a priority threshold or to a reference count of another code module to determine whether the reference count of the first code module exceeds the threshold or the other reference count. When the reference count of the first code module decreases so that it no longer exceeds the threshold or the other reference count, the first code module may have a low priority.

In some embodiments, the processing device may implement any combination of blocks 1102-1108 during different states of the computing device, such as at or during compile and/or link time, boot time, and/or run time. For example, blocks 1102-1108 may be implemented during run time.

The various embodiments (including, but not limited to, embodiments described above with reference to FIGS. 1-11) may be implemented in a wide variety of computing systems including mobile computing devices, an example of which suitable for use with the various embodiments is illustrated in FIG. 9. The mobile computing device 1200 may include a processor 1202 coupled to a touchscreen controller 1204 and an internal memory 1206. The processor 1202 may be one or more multicore integrated circuits designated for general or specific processing tasks. The internal memory 1206 may be volatile or non-volatile memory, and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 1204 and the processor 1202 may also be coupled to a touchscreen panel 1212, such as a resistive-sensing touchscreen, capacitive-sensing touchscreen, infrared sensing touchscreen, etc. Additionally, the display of the mobile computing device 1200 need not have touch screen capability.

The mobile computing device 1200 may have one or more radio signal transceivers 1208 (e.g., Peanut, Bluetooth, ZigBee, Wi-Fi, RF radio) and antennae 1210, for sending and receiving communications, coupled to each other and/or to the processor 1202. The transceivers 1208 and antennae 1210 may be used with the above-mentioned circuitry to implement the various wireless transmission protocol stacks and interfaces. The mobile computing device 1200 may include a cellular network wireless modem chip 1216 that enables communication via a cellular network and is coupled to the processor.

The mobile computing device 1200 may include a peripheral device connection interface 1218 coupled to the processor 1202. The peripheral device connection interface 1218 may be singularly configured to accept one type of connection, or may be configured to accept various types of physical and communication connections, common or proprietary, such as Universal Serial Bus (USB), FireWire, Thunderbolt, or PCIe. The peripheral device connection interface 1218 may also be coupled to a similarly configured peripheral device connection port (not shown).

The mobile computing device 1200 may also include speakers 1214 for providing audio outputs. The mobile computing device 1200 may also include a housing 1220, constructed of a plastic, metal, or a combination of materials, for containing all or some of the components described herein. The mobile computing device 1200 may include a power source 1222 coupled to the processor 1202, such as a disposable or rechargeable battery. The rechargeable battery may also be coupled to the peripheral device connection port to receive a charging current from a source external to the mobile computing device 1200. The mobile computing device 1200 may also include a physical button 1224 for receiving user inputs. The mobile computing device 1200 may also include a power button 1226 for turning the mobile computing device 1200 on and off.

Figure 13:
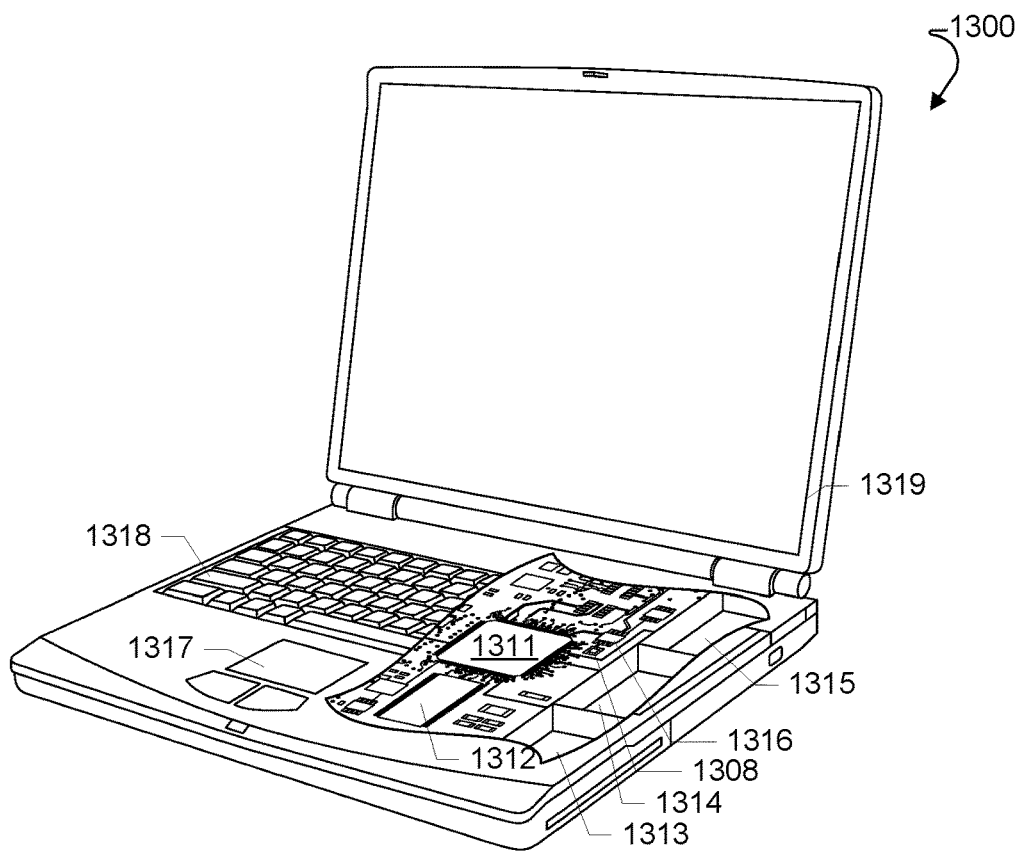
FIG. 13 is a component block diagram illustrating an example mobile computing device suitable for use with the various embodiments.

The various embodiments (including, but not limited to, embodiments described above with reference to FIGS. 1-11) may be implemented in a wide variety of computing systems include a laptop computer 1300 an example of which is illustrated in FIG. 13. Many laptop computers include a touchpad touch surface 1317 that serves as the computer's pointing device, and thus may receive drag, scroll, and flick gestures similar to those implemented on computing devices equipped with a touch screen display and described above. A laptop computer 1300 will typically include a processor 1311 coupled to volatile memory 1312 and a large capacity nonvolatile memory, such as a disk drive 1313 of Flash memory. Additionally, the computer 1300 may have one or more antenna 1308 for sending and receiving electromagnetic radiation that may be connected to a wireless data link and/or cellular telephone transceiver 1316 coupled to the processor 1311. The computer 1300 may also include a floppy disc drive 1314 and a compact disc (CD) drive 1315 coupled to the processor 1311. In a notebook configuration, the computer housing includes the touchpad 1317, the keyboard 1318, and the display 1319 all coupled to the processor 1311. Other configurations of the computing device may include a computer mouse or trackball coupled to the processor (e.g., via a USB input) as are well known, which may also be used in conjunction with the various embodiments.

Figure 14:
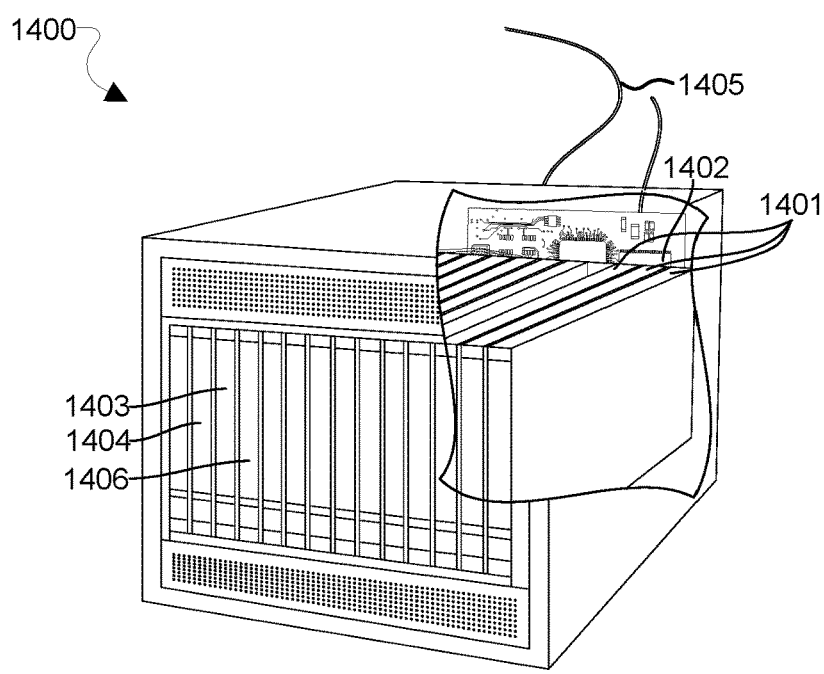
FIG. 14 is a component block diagram illustrating an example server suitable for use with the various embodiments.

The various embodiments (including, but not limited to, embodiments described above with reference to FIGS. 1-11) may also be implemented in fixed computing systems, such as any of a variety of commercially available servers. An example server 1400 is illustrated in FIG. 14. Such a server 1400 typically includes one or more multicore processor assemblies 1401 coupled to volatile memory 1402 and a large capacity nonvolatile memory, such as a disk drive 1404. As illustrated in FIG. 14, multicore processor assemblies 1401 may be added to the server 1400 by inserting them into the racks of the assembly. The server 1400 may also include a floppy disc drive, compact disc (CD) or digital versatile disc (DVD) disc drive 1406 coupled to the processor 1401. The server 1400 may also include network access ports 1403 coupled to the multicore processor assemblies 1401 for establishing network interface connections with a network 1405, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

Computer program code or "program code" for execution on a programmable processor for carrying out operations of the various embodiments may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various embodiments may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein, but is to be accorded the widest scope consistent with the following claims and the principles and novel features disclosed herein.

What is claimed is:

1. A method of external paging and swapping of dynamic modules on a computing device, comprising:
    assigning static virtual addresses to a base image and dynamic modules of a static image of firmware of the computing device from a virtual address space for the static image;
    decomposing the static image into the base image and the dynamic modules;
    loading the base image to an execution memory during a boot time from a first partition of a storage memory;
    reserving a swap pool in the execution memory during the boot time;
    loading a first dynamic module of the dynamic modules to the swap pool from a second partition of the storage memory during a run time;
    determining users of the first dynamic module;
    incrementing a reference count for each user determined to be using the first dynamic module; and
    decrementing the reference count for each user determined to no longer be using of the first dynamic module.

2. The method of claim 1, wherein the first dynamic module comprises a code module and a data module and loading the first dynamic module to the swap pool from a second partition of the storage memory comprises loading the code module to the swap pool from the second partition of the storage memory, the method further comprising:
    mapping a static virtual address of the code module to a physical block address of the second partition of the storage memory;
    mapping a static virtual address of the data module to a physical block address of a third partition of the storage memory; and
    mapping the static virtual address of the code module to a physical address of the swap pool of the execution memory.

3. The method of claim 1, wherein reserving a swap pool in an execution memory during the boot time comprises reserving a portion of the execution memory sized to store a largest of the dynamic modules.

4. The method of claim 1, wherein the dynamic modules comprise a plurality of code modules, and wherein reserving a swap pool in an execution memory during the boot time comprises reserving a portion of the execution memory sized to store a compressed version of a largest of the plurality of code modules.

5. The method of claim 1, further comprising:
    receiving a request to access a second dynamic module of the dynamic modules from the second partition of the storage memory;
    determining whether the first dynamic module is higher priority than the second dynamic module; and
    evicting the first dynamic module from the swap pool in response to determining that the first dynamic module is not higher priority than the second dynamic module.

6. The method of claim 1, wherein the first dynamic module comprises a code module and a data module, the method further comprising:
    determining whether data generated by the first dynamic module during execution of the first dynamic module is needed for a subsequent execution of the first dynamic module; and
    storing the data to the data module in a third partition of the storage memory in response to determining that the data generated by the first dynamic module during execution of the first dynamic module is needed for a subsequent execution of the first dynamic module.

7. The method of claim 1, wherein the first dynamic module is in a compressed format, the method further comprising:
    identifying that the first dynamic module is in the compressed format by an association of a static virtual address of the first dynamic module and an indicator that the first dynamic module is in the compressed format, wherein loading a first dynamic module to the swap pool from a second partition of the storage memory during a run time comprises decompressing the first dynamic module to load the first dynamic module to the swap pool.

8. A computing device, comprising:
    an execution memory;
    a storage memory; and
    a processor communicatively connected to the execution memory and the storage memory, wherein the processor is configured with processor-executable instructions to cause the processor to execute operations comprising:
        assigning static virtual addresses to a base image and dynamic modules of a static image of firmware of the computing device from a virtual address space for the static image;
        decomposing the static image into the base image and the dynamic modules;
        loading the base image to the execution memory during a boot time from a first partition of the storage memory;
        reserving a swap pool in the execution memory during the boot time;
        loading a first dynamic module of the dynamic modules to the swap pool from a second partition of the storage memory during a run time;
        determining users of the first dynamic module;
        incrementing a reference count for each user determined to be using the first dynamic module; and
        decrementing the reference count for each user determined to no longer be using of the first dynamic module.

9. The computing device of claim 8, wherein:
    the first dynamic module comprises a code module and a data module;
    the processor is configured with processor-executable instructions to perform operations such that loading the first dynamic module to the swap pool from a second partition of the storage memory comprises loading the code module to the swap pool from the second partition of the storage memory; and
    the processor is configured with processor-executable instructions to perform operations further comprising:

mapping a static virtual address of the code module to a physical block address of the second partition of the storage memory;
mapping a static virtual address of the data module to a physical block address of a third partition of the storage memory; and
mapping the static virtual address of the code module to a physical address of the swap pool of the execution memory.

10. The computing device of claim 8, wherein the processor is configured with processor-executable instructions to perform operations such that reserving a swap pool in an execution memory during the boot time comprises reserving a portion of the execution memory sized to store a largest of the dynamic modules.

11. The computing device of claim 8, wherein:
the dynamic modules comprise a plurality of code modules; and
the processor is configured with processor-executable instructions to perform operations such that reserving a swap pool in an execution memory during the boot time comprises reserving a portion of the execution memory sized to store a compressed version of a largest of the plurality of code modules.

12. The computing device of claim 8, wherein the processor is configured with processor-executable instructions to perform operations further comprising:
receiving a request to access a second dynamic module of the dynamic modules from the second partition of the storage memory;
determining whether the first dynamic module is higher priority than the second dynamic module; and
evicting the first dynamic module from the swap pool in response to determining that the first dynamic module is not higher priority than the second dynamic module.

13. The computing device of claim 8, wherein:
the first dynamic module comprises a code module and a data module; and
the processor is configured with processor-executable instructions to perform operations further comprising:
determining whether data generated by the first dynamic module during execution of the first dynamic module is needed for a subsequent execution of the first dynamic module; and
storing the data to the data module in a third partition of the storage memory in response to determining that the data generated by the first dynamic module during execution of the first dynamic module is needed for a subsequent execution of the first dynamic module.

14. The computing device of claim 8, wherein:
the first dynamic module is in a compressed format;
the processor is configured with processor-executable instructions to perform operations further comprising identifying that the first dynamic module is in the compressed format by an association of a static virtual address of the first dynamic module and an indicator that the first dynamic module is in the compressed format; and
the processor is configured with processor-executable instructions to perform operations such that loading a first dynamic module to the swap pool from a second partition of the storage memory during a run time comprises decompressing the first dynamic module to load the first dynamic module to the swap pool.

15. A computing device, comprising:
means for assigning static virtual addresses to a base image and dynamic modules of a static image of firmware of the computing device from a virtual address space for the static image;
means for decomposing the static image into the base image and the dynamic modules;
means for loading the base image to an execution memory during a boot time from a first partition of a storage memory;
means for reserving a swap pool in the execution memory during the boot time;
means for loading a first dynamic module of the dynamic modules to the swap pool from a second partition of the storage memory during a run time;
means for determining users of the first dynamic module;
means for incrementing a reference count for each user determined to be using the first dynamic module; and
means for decrementing the reference count for each user determined to no longer be using of the first dynamic module.

16. The computing device of claim 15, wherein the first dynamic module comprises a code module and a data module and means for loading the first dynamic module to the swap pool from a second partition of the storage memory comprises means for loading the code module to the swap pool from the second partition of the storage memory, the computing device further comprising:
means for mapping a static virtual address of the code module to a physical block address of the second partition of the storage memory;
means for mapping a static virtual address of the data module to a physical block address of a third partition of the storage memory; and
means for mapping the static virtual address of the code module to a physical address of the swap pool of the execution memory.

17. The computing device of claim 15, wherein means for reserving a swap pool in an execution memory during the boot time comprises means for reserving a portion of the execution memory sized to store a largest of the dynamic modules.

18. The computing device of claim 15, wherein:
the dynamic modules comprise a plurality of code modules;
the first dynamic module is in a compressed format;
means for reserving a swap pool in an execution memory during the boot time comprises means for reserving a portion of the execution memory sized to store a compressed version of a largest of the plurality of code modules;
the computing device further comprises means for identifying that the first dynamic module is in the compressed format by an association of a static virtual address of the first dynamic module and an indicator that the first dynamic module is in the compressed format; and
means for loading a first dynamic module to the swap pool from a second partition of the storage memory during a run time comprises means for decompressing the first dynamic module to load the first dynamic module to the swap pool.

19. The computing device of claim 15, further comprising:
means for receiving a request to access a second dynamic module of the dynamic modules from the second partition of the storage memory;

means for determining whether the first dynamic module is higher priority than the second dynamic module; and means for evicting the first dynamic module from the swap pool in response to determining that the first dynamic module is not higher priority than the second dynamic module.

20. The computing device of claim 15, wherein the first dynamic module comprises a code module and a data module, the computing device further comprising:

means for determining whether data generated by the first dynamic module during execution of the first dynamic module is needed for a subsequent execution of the first dynamic module; and means for storing the data to the data module in a third partition of the storage memory in response to determining that the data generated by the first dynamic module during execution of the first dynamic module is needed for a subsequent execution of the first dynamic module.

21. A non-transitory processor-readable storage medium having stored thereon processor-executable instructions configured to cause a processor of a computing device to perform operations comprising:

assigning static virtual addresses to a base image and dynamic modules of a static image of firmware of the computing device from a virtual address space for the static image;

decomposing the static image into the base image and the dynamic modules;

loading the base image to an execution memory during a boot time from a first partition of a storage memory;

reserving a swap pool in the execution memory during the boot time;

loading a first dynamic module of the dynamic modules to the swap pool from a second partition of the storage memory during a run time;

determining users of the first dynamic module;

incrementing a reference count for each user determined to be using the first dynamic module; and decrementing the reference count for each user determined to no longer be using of the first dynamic module.

22. The non-transitory processor-readable storage medium of claim 21, wherein:

the first dynamic module comprises a code module and a data module;

the stored processor-executable instructions are configured to cause the processor of the computing device to perform operations such that loading the first dynamic module to the swap pool from a second partition of the storage memory comprises loading the code module to the swap pool from the second partition of the storage memory; and the stored processor-executable instructions are configured to cause the processor of the computing device to perform operations further comprising:

mapping a static virtual address of the code module to a physical block address of the second partition of the storage memory;

mapping a static virtual address of the data module to a physical block address of a third partition of the storage memory; and mapping the static virtual address of the code module to a physical address of the swap pool of the execution memory.

23. The non-transitory processor-readable storage medium of claim 21, wherein the stored processor-executable instructions are configured to cause the processor of the computing device to perform operations such that reserving a swap pool in an execution memory during the boot time comprises reserving a portion of the execution memory sized to store a largest of the dynamic modules.

24. The non-transitory processor-readable storage medium of claim 21, wherein:

the dynamic modules comprise a plurality of code modules;

the first dynamic module is in a compressed format;

the stored processor-executable instructions are configured to cause the processor of the computing device to perform operations such that reserving a swap pool in an execution memory during the boot time comprises reserving a portion of the execution memory sized to store a compressed version of a largest of the plurality of code modules;

the stored processor-executable instructions are configured to cause the processor of the computing device to perform operations further comprising means for identifying that the first dynamic module is in the compressed format by an association of a static virtual address of the first dynamic module and an indicator that the first dynamic module is in the compressed format; and the stored processor-executable instructions are configured to cause the processor of the computing device to perform operations such that loading a first dynamic module to the swap pool from a second partition of the storage memory during a run time comprises decompressing the first dynamic module to load the first dynamic module to the swap pool.

25. The non-transitory processor-readable storage medium of claim 21, wherein the stored processor-executable instructions are configured to cause the processor of the computing device to perform operations further comprising:

receiving a request to access a second dynamic module of the dynamic modules from the second partition of the storage memory;

determining whether the first dynamic module is higher priority than the second dynamic module; and evicting the first dynamic module from the swap pool in response to determining that the first dynamic module is not higher priority than the second dynamic module.

26. The non-transitory processor-readable storage medium of claim 21, wherein:

the first dynamic module comprises a code module and a data module; and the stored processor-executable instructions are configured to cause the processor of the computing device to perform operations further comprising:

determining whether data generated by the first dynamic module during execution of the first dynamic module is needed for a subsequent execution of the first dynamic module; and storing the data to the data module in a third partition of the storage memory in response to determining that the data generated by the first dynamic module during execution of the first dynamic module is needed for a subsequent execution of the first dynamic module.

* * * * *